(12) United States Patent
Aho et al.

(10) Patent No.: US 7,658,233 B1
(45) Date of Patent: Feb. 9, 2010

(54) SELF-PROPELLED TRANSPORTABLE ROCK PICKER

(76) Inventors: Melvin S. Aho, 5512 NE. 109th Ct., Suite 101, Vancouver, WA (US) 98662; Perry J. Gilmour, 4818 NE. 379th St., La Center, WA (US) 98629

( * ) Notice: Subject to any disclaimer, the term of this patent is extended or adjusted under 35 U.S.C. 154(b) by 0 days.

(21) Appl. No.: 12/231,872

(22) Filed: Sep. 3, 2008

(51) Int. Cl.
*A01B 43/00* (2006.01)

(52) U.S. Cl. .......................... 171/63; 198/431

(58) Field of Classification Search ............. 171/63–65, 171/110, 138, 105, 86, 144; 56/328.1, 344, 56/377; 414/439, 440, 503–505, 523, 528; 198/511, 587, 861.1, 510.1, 520, 431, 502–505
See application file for complete search history.

(56) References Cited

U.S. PATENT DOCUMENTS

| | | | |
|---|---|---|---|
| 19,430 A | 2/1858 | Maydole | |
| 47,566 A | 5/1865 | Quimby | |
| 624,852 A | 5/1899 | Nugent | |
| 946,115 A | 1/1910 | Edens | |
| 946,273 A | 1/1910 | Richards | |
| 1,478,142 A | 12/1923 | Ortmann | |
| 1,563,340 A | 12/1925 | Christenson | |
| 2,363,682 A | 11/1944 | Madsen et al. | |
| 2,686,394 A | 8/1954 | Kalaus et al. | |
| 2,725,700 A | 12/1955 | Fahrenholz | |
| 2,924,284 A | 2/1960 | Cykler et al. | |
| 3,117,631 A | 1/1964 | Fehrenholz | |
| 3,261,408 A | 7/1966 | Simonar | |
| 3,431,979 A | 3/1969 | Gregerson | |
| 3,739,855 A | 6/1973 | Bliss | |
| 3,782,477 A | 1/1974 | Fahrenholz | |
| 4,040,489 A | 8/1977 | Hulicsko | |
| 4,059,158 A | 11/1977 | Ranger | |
| 4,153,114 A | 5/1979 | Morlock | |
| 4,221,265 A | 9/1980 | Pratt | |
| 4,282,932 A | 8/1981 | Anderson | |
| 4,296,818 A | 10/1981 | Malinowski et al. | |
| 4,301,869 A | 11/1981 | Dubois | |
| 4,319,641 A | 3/1982 | Degelman | |
| 4,345,655 A | 8/1982 | Fahrenholz | |
| 4,609,049 A | 9/1986 | Migdal | |
| 4,609,050 A | 9/1986 | Jacobs et al. | |
| 4,878,802 A * | 11/1989 | Hansen et al. | ............... 414/523 |
| 5,027,906 A | 7/1991 | Jeannotte et al. | |
| 5,310,008 A | 5/1994 | Dauvin | |
| 6,041,866 A | 3/2000 | Smith | |
| 6,702,034 B2 | 3/2004 | Clary | |
| 7,028,460 B1 | 4/2006 | Fahrenholz | |

* cited by examiner

*Primary Examiner*—Robert E Pezzuto
(74) *Attorney, Agent, or Firm*—Rylander & Associates PC; Kurt M. Rylander; Marr E. Beatty

(57) ABSTRACT

An improved rock picker system includes a prime mover, with an operator's cab and towing apparatus; windrows detachably and foldingly mounted to the prime mover front; a collector; a separator; a transfer apparatus; a dump trailer detachably connectable to the prime mover towing apparatus; an hydraulic power supply in fluid communication with the hydraulic loads; and, controls for controlling the hydraulic power supply and hydraulic loads individually. Controls include a plurality of remotely operated hydraulic control valves corresponding to the hydraulic loads and a control panel in electrical communication with the remotely operated hydraulic control valves, and speed controllers for controlling the speed of the hydraulic loads.

32 Claims, 14 Drawing Sheets

SELF-PROPELLED TRANSPORTABLE ROCK PICKER

FIELD OF THE INVENTION

The present invention relates to rock picker systems. More particularly, the present invention relates to an improved, self-propelled, collapsible and transportable rock picker with an integral lift-tilt dump body and infinitely controllable speeds.

BACKGROUND

Since the introduction of plows to agriculture the need to remove rocks from crop fields has been a pressing concern. Rocks contacting plows can break the plow blades or become jammed in the moving equipment causing gears and connectors to become misaligned or damaged. Rocks can also interfere with some types of harvesting equipment and other agricultural machinery.

Problems caused by rock damage to agricultural equipment go beyond the damaged equipment. Agriculture is a time-sensitive occupation where delays in planting or harvesting while equipment is repaired can cause the loss of part, or all, of a crop. Moreover, with more and more pressure to absorb farmland into urban developments there is greater imperative to put marginal agricultural land to use, such as locations with high rock content in the soil.

Existing rock picker apparatus are not able to optimize their operation to varying soil/terrain conditions. They are unable to automatically adjust their collection systems to accommodate rocks of varying sizes. Existing systems cannot easily be optimized by adjusting speed ratios and relative positioning of components. Adjustment is difficult in this regard, generally requiring machine shutdown while a mechanic (or mechanics) make physical adjustments through levers or by replacing gearboxes and belts. Operators cannot quickly stop individual components or raise them to clear obstacles thereby creating potentially unsafe conditions. Operators cannot reverse the direction of operation for components in the event of jams or for maintenance, leaving them very vulnerable to jamming by large rocks or non-rock obstacles, or due to very uneven ground. Additionally, existing systems have low storage volume for rocks removed from the field and they do not provide for easy offloading of rock. Existing apparatus generally require towing the rock picker and separator apparatus behind a tractor, which reduces their maneuverability and prevents the forward facing operator from monitoring equipment during operation. Existing apparatus have focused on particular pieces of technology or gadgets but have not solved the problem of integrating an efficient machine which can be operated by a single person from within an operating cab. Apparatus such as described by Fahrenholz, below, require complex customized mechanical linkages and gearing systems which are difficult to maintain, very exposed to damage and weather, and not amenable to optimization. Existing apparatus do not provide a feedwheel mechanism to provide positive capture for efficient transfer of material into a collector mechanism. All of these shortcomings severely impact efficiency and increase the amount of skilled labor required to clear fields—and thus increase costs.

Thus, there is a need for a self-propelled rock picker system that:
1) is capable of extracting, storing and dumping a large volume of rock from a field with a high rate of efficiency; 2) can recover quickly and safely from jammed components by operating components selectively in reverse; 3) provides easily adjustable component speeds, speed ratios and heights for optimizing according to field conditions and worn components; 4) enhances safety by providing for an emergency shutdown function for moving components without requiring engine shutdown; 5) is forward mounted so an operator can easily monitor equipment during operation; 6) is forward mounted for improved maneuverability; 7) allows operation of all components from the cab of a tractor or other prime mover; 8) includes a large capacity articulated trailer controllable from an operator's cab for dumping accumulated rocks; 9) includes a feedwheel for efficient collection of rock material; 10) can be retrofitted onto the frames of existing combine tractors; 11) is capable of clearing three acres of cleared land per hour; 12) can be folded by a single operator for transport or stowage; 13) does not require complex customized mechanical linkages and gear systems; 14) permits components to be changed to different size or style, which may require different speed ratios, without need to design new linkages, gearboxes, or belt systems; 15) facilitates use of remote operation of components; 16) facilitates use of effective safety control interlocks.

A number of devices have provided rock pickers, but lack the flexibility, safety, reliability and capacity of the present invention. Presently known art attempts to address this problem, but has not completely solved the problem. The following represents a list of known related art:

| Reference: | Issued to: | Date of Issue: |
| --- | --- | --- |
| U.S. Pat. No. 7,028,460 B1 | Fahrenholz | Apr. 18, 2006 |
| U.S. Pat. No. 4,345,655 | Fahrenholz | Aug. 24, 1982 |
| U.S. Pat. No. 3,782,477 | Fahrenholz | Jan. 1, 1974 |
| U.S. Pat. No. 3,117,631 | Fahrenholz | Jan. 14, 1964 |
| U.S. Pat. No. 2,725,700 | Fahrenholz | Dec. 6, 1955 |
| U.S. Pat. No. 6,702,034 B2 | Clary | Mar. 9, 2004 |
| U.S. Pat. No. 6,041,866 | Smith | Mar. 28, 2000 |
| U.S. Pat. No. 5,310,008 | Dauvin | May 10, 1994 |
| U.S. Pat. No. 5,027,906 | Jeannotte et al | Jul. 2, 1991 |
| U.S. Pat. No. 4,609,050 | Jacobs et al | Sep. 2, 1986 |
| U.S. Pat. No. 4,609,049 | Migdal | Sep. 2, 1986 |
| U.S. Pat. No. 4,319,641 | Degelman | Mar. 16, 1982 |
| U.S. Pat. No. 4,301,869 | Dubois | Nov. 24, 1981 |
| U.S. Pat. No. 4,296,818 | Malinowski et al | Oct. 27, 1981 |
| U.S. Pat. No. 4,282,932 | Anderson | Aug. 11, 1981 |
| U.S. Pat. No. 4,221,265 | Pratt | Sep. 9, 1980 |
| U.S. Pat. No. 4,153,114 | Morlock | May 8, 1979 |
| U.S. Pat. No. 4,059,158 | Ranger | Nov. 22, 1977 |
| U.S. Pat. No. 4,040,489 | Hulicsko | Aug. 9, 1977 |
| U.S. Pat. No. 3,739,855 | Bliss | Jun. 19, 1973 |
| U.S. Pat. No. 3,431,979 | Gregerson | Mar. 11, 1969 |
| U.S. Pat. No. 3,261,408 | Simonar | Jul. 19, 1966 |
| U.S. Pat. No. 2,924,284 | Cykler et al | Feb. 9, 1960 |
| U.S. Pat. No. 2,686,394 | Kalaus et al | Aug. 17, 1954 |
| U.S. Pat. No. 2,363,682 | Madsen et al | Nov. 28, 1944 |
| U.S. Pat. No. 1,563,340 | Christenson | Dec. 1, 1925 |
| U.S. Pat. No. 1,478,142 | Ortmann | Dec. 18, 1923 |
| U.S. Pat. No. 946,115 | Edens | Jan. 11, 1910 |
| U.S. Pat. No. 946,273 | Richards | Jan. 11, 1910 |
| U.S. Pat. No. 624,852 | Nugent | May 9, 1899 |
| U.S. Pat. No. 047,566 | Quimby | May 2, 1865 |
| U.S. Pat. No. 019,430 | Maydole | Feb. 23, 1858 |

The teachings of each of the above-listed citations (which does not itself incorporate essential material by reference) are herein incorporated by reference. None of the above inventions and patents, taken either singularly or in combination, is seen to describe the instant invention as claimed.

Fahrenholz in several patents teaches rock picker systems: U.S. Pat. No. 7,028,460 B1 (the Fahrenholz '460 patent); U.S. Pat. No. 4,345,655 (the Fahrenholz '655 patent); U.S. Pat. No. 3,782,477 (the Fahrenholz '477 patent); U.S. Pat. No.

3,117,631 (the Fahrenholz '631 patent); U.S. Pat. No. 2,725, 700 (the Fahrenholz '700 patent).

The Fahrenholz patents (collectively referred to here as "Fahrenholz") teach towed rock picker systems utilizing windrows, drum separators, and complicated conveyor systems. Fahrenholz does not teach individually controlled components, but rather mechanically linked components using complicated systems of drive shafts, sprockets, chains and mechanically clutched belts, with all parts operating at fixed speed ratios. Fahrenholz does not teach the use of independent drive motors which are infinitely adjustable and reversible, and individually operable from the cab of a prime mover. Fahrenholz teaches conveyors using manual cable-actuated clutches, which require the operator to operate levers requiring significant strength and skill. Towed systems such as Fahrenholz reduce maneuverability and visibility. Fahrenholz does not teach a dynamically mounted feed wheel to handle rocks of varying sizes. Fahrenholz does not teach mounting a rock picking system forwardly for improved visibility and maneuverability. Fahrenholz does not teach the use of a foldable system which can be folded by a single operator for transport or stowage.

Fahrenholz '631 teaches a towed, single windrow apparatus for forming a windrow of rocks for a separate rock picker to collect. The apparatus utilizes a transverse-mounted frame supporting a roller powered by mechanical linkages from a tractor motor using a power-take-off (PTO).

Fahrenholz '655 teaches the use of a rock tumbler for separating rocks from soil, and windrows, but towed behind a tractor on a separate frame so that an operator cannot monitor the equipment while driving the tractor. Fahrenholz '655 teaches the use of mechanical belts and linkages for power transmission, with fixed gear ratios, preventing adjustment of component speeds, heights or depth of ground penetration. There is no provision for reversing components in the event of jams. The arrangement of the overlaid conveyor belts is complicated and difficult to maintain. The intermediate storage conveyor in Fahrenholz '655 does not have high capacity and can only be off-loaded while running certain other equipment, such as the rock tumbler, due to the mechanical linkages. Fahrenholz requires a second tractor to tow a collection trailer in parallel with the rock picker in order to provide adequate intermediate storage. This adds a second operator and can be difficult in uneven terrain. It can even lead to serious accidents if the tractors collide or the second tractor/trailer gets tangled with the conveyor system.

Thus, while the foregoing body of art indicates it to be well known to have a rock picker, the art described above does not teach or suggest a rock picker system which has the following combination of desirable features: (1) the system can be retrofitted to the frame of a standard combine tractor or other prime mover with the addition of a hydraulic power supply; (2) the hydraulic power supply can run off the prime mover engine or an independent APU for flexibility; (3) the system folds for transport on a flatbed truck; (4) speeds of all components are infinitely adjustable in order to optimize operation for different rock/soil conditions or worn components; (5) rotating components are reversible to enable recovery from jams; (6) hydraulic drives and cylinders are easily stopped in emergency, greatly improving safety; (7) front mounting providing an operator better visibility and safety; (8) front mounting providing improved maneuverability; (9) a large capacity articulated rock box providing rapid unloading into any bulk container, or directly into fill, by a single operator; (10) independently driven components allowing rapid change out of damaged/worn parts; (11) independently driven components permitting a single operator to control all operations from a position inside the cab of a prime mover; (12) ease of adjustability, maneuverability, and high capacity enabling a single operator to clear up to three acres per hour or more; (13) the ability to upgrade individual components; and (14) incorporates a feed wheel to increase efficiency of rock collection.

Still other features would be desirable. For example, existing systems do not facilitate closed loop automation and computerized control. Existing apparatus do not provide for replacement or upgrading of modular components. Existing apparatus do not provide a feed wheel to assist in the collection of larger rocks and breaking down aggregate chunks. Existing apparatus do not address the needs in the field with an integrated systems approach to address problems of optimization, upgradeability, maintenance, reliability, and safety.

SUMMARY AND ADVANTAGES

An improved self-propelled, transportable, rock picker system includes a prime mover, the prime mover including an operator's cab and towing means; a hydraulic power supply mounted to the prime mover; windrow means detachably and foldingly mounted to and extending forward from the prime mover, for agitating soil and causing rocky soil to move toward centrally mounted collector means; collector means mounted to the prime mover for collecting the rocky soil from said windrow means and moving the rocky soil to separator means; separator means mounted to the prime mover for receiving the rocky soil from the collector means and separating rocks from the rocky soil and moving the rocks to transfer means; transfer means mounted to the prime mover for receiving rocks from the separator means and transferring the rocks to dump trailer means; dump trailer means detachably connectable to the prime mover towing means for receiving and storing rocks from the transfer means, transporting the rocks to an offloading location, and offloading said rocks; hydraulic power distribution means for hydraulically connecting the hydraulic power supply to at least the windrow means, the collector means, the separator means, the transfer means, and the dump trailer means, the hydraulic power distribution means including remotely operated hydraulic control valves; and, control means for controlling at least the hydraulic power supply, the hydraulic power distribution means, the windrow means, the collector means, the separator means, the transfer means, and the dump trailer means.

The improvements in safety and efficiency are a tremendous advance over existing systems. As an example, in testing, an embodiment of this novel rock picker system was run on eighteen acres of rocky farmland in Minnesota, removing eighteen loads of rock with each load totaling approximately 10-12 yards of material. This was accomplished in a single 8-hour day. Existing rock pickers would take at least 2 or 3 days to accomplish the same coverage. The incorporation of a feed wheel into the improved rock picker system greatly improved efficiency by actively assisting in transferring rocks accumulating in front of the feed conveyor onto the feed conveyor, rather than simply relying on them to simply spill over onto the conveyor inlet.

The rock picker system of the present invention presents numerous advantages, including: (1) the system can be retrofitted to the frame of a standard combine tractor or other prime mover with the addition of a hydraulic power supply; (2) the hydraulic power supply can run off the prime mover engine or an independent APU for flexibility; (3) the system folds for transport on a flatbed truck; (4) speeds of all components are infinitely adjustable in order to optimize operation for different rock/soil conditions or worn components; (5) rotating components are reversible to enable ejection of jammed material; (6) hydraulic drives and cylinders are easily stopped in emergency, greatly improving safety; (7) front mounting provides an operator better visibility and safety; (8) front mounting provides improved maneuverability; (9) a large capacity articulated rock box provides rapid unloading into any bulk container, or directly into fill by a single operator; (10) hydraulic components allow rapid change out of damaged/worn parts; (11) hydraulic components permit a single operator to control all operations from a position inside the cab of a prime mover; (12) ease of adjustability, maneuverability, and high capacity enable a single operator to clear up to three acres per hour or more; (13) the ability to upgrade individual components; and, (14) a feed wheel is incorporated to increase efficiency of rock collection.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN DRAWINGS

Figure 1:
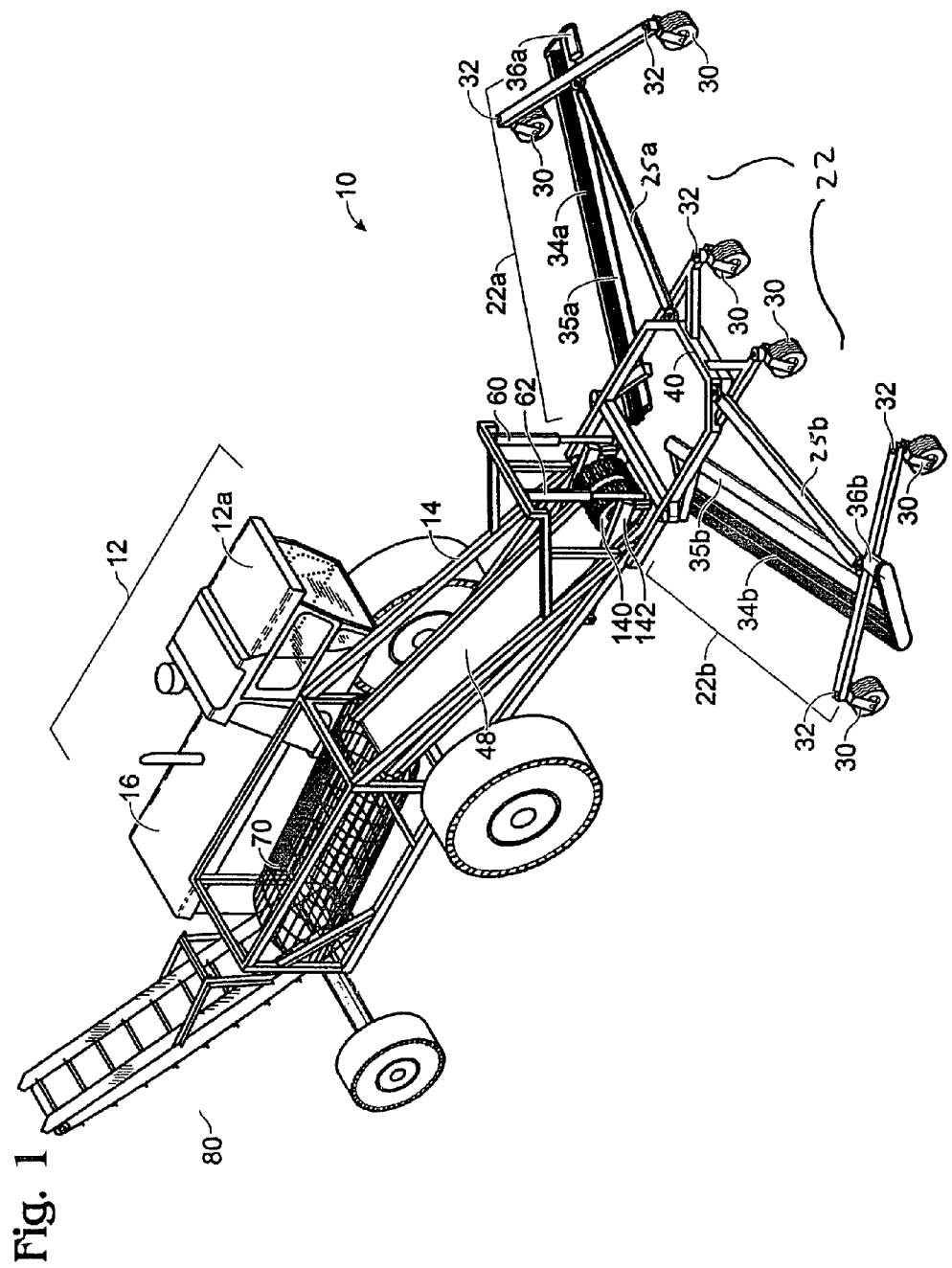
FIG. 1 shows a front perspective view of a rock picker system mounted to a prime mover.
Figure 2:
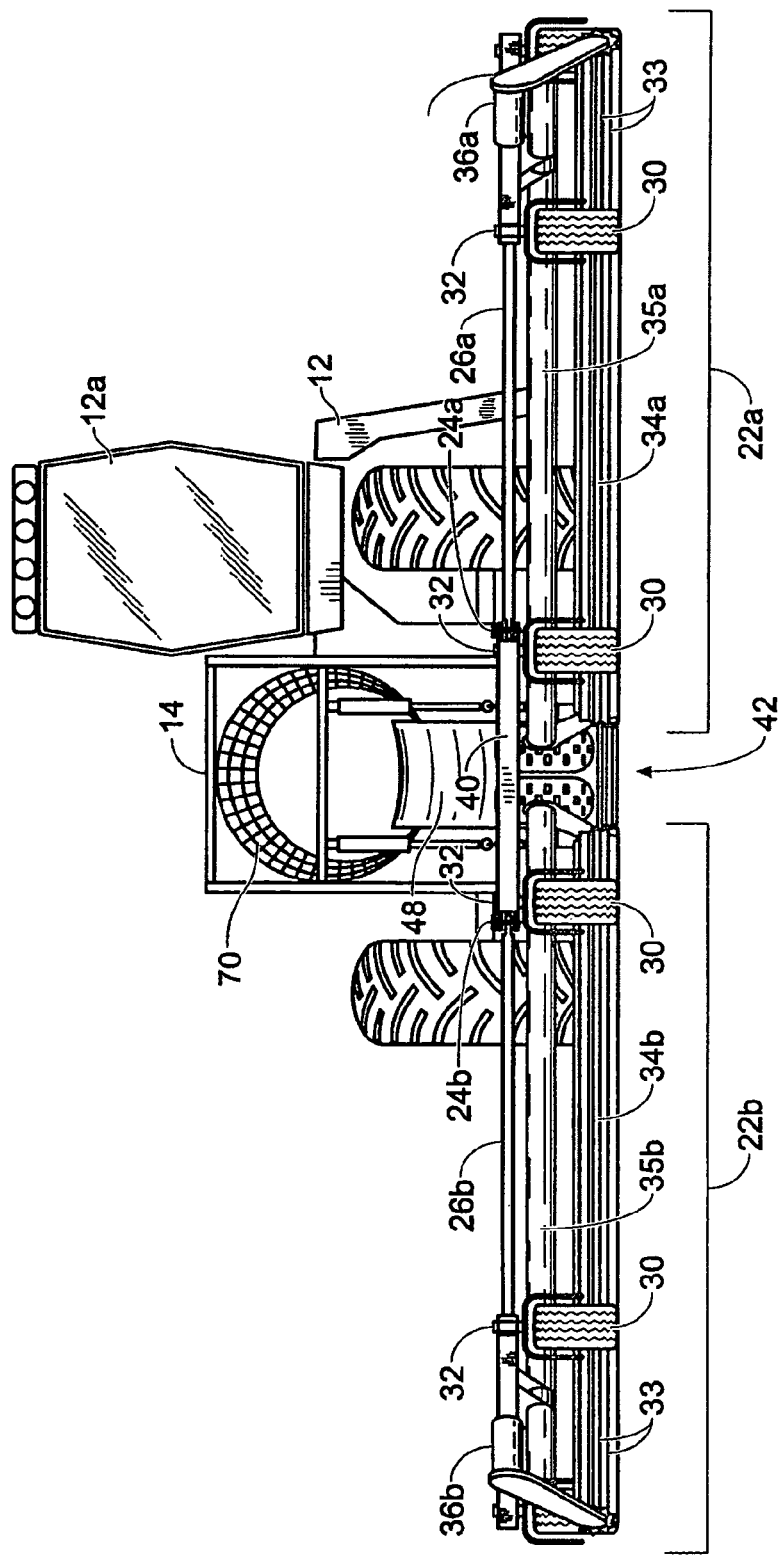
FIG. 2 shows a front view of a rock picker system mounted to a prime mover.
Figure 3:
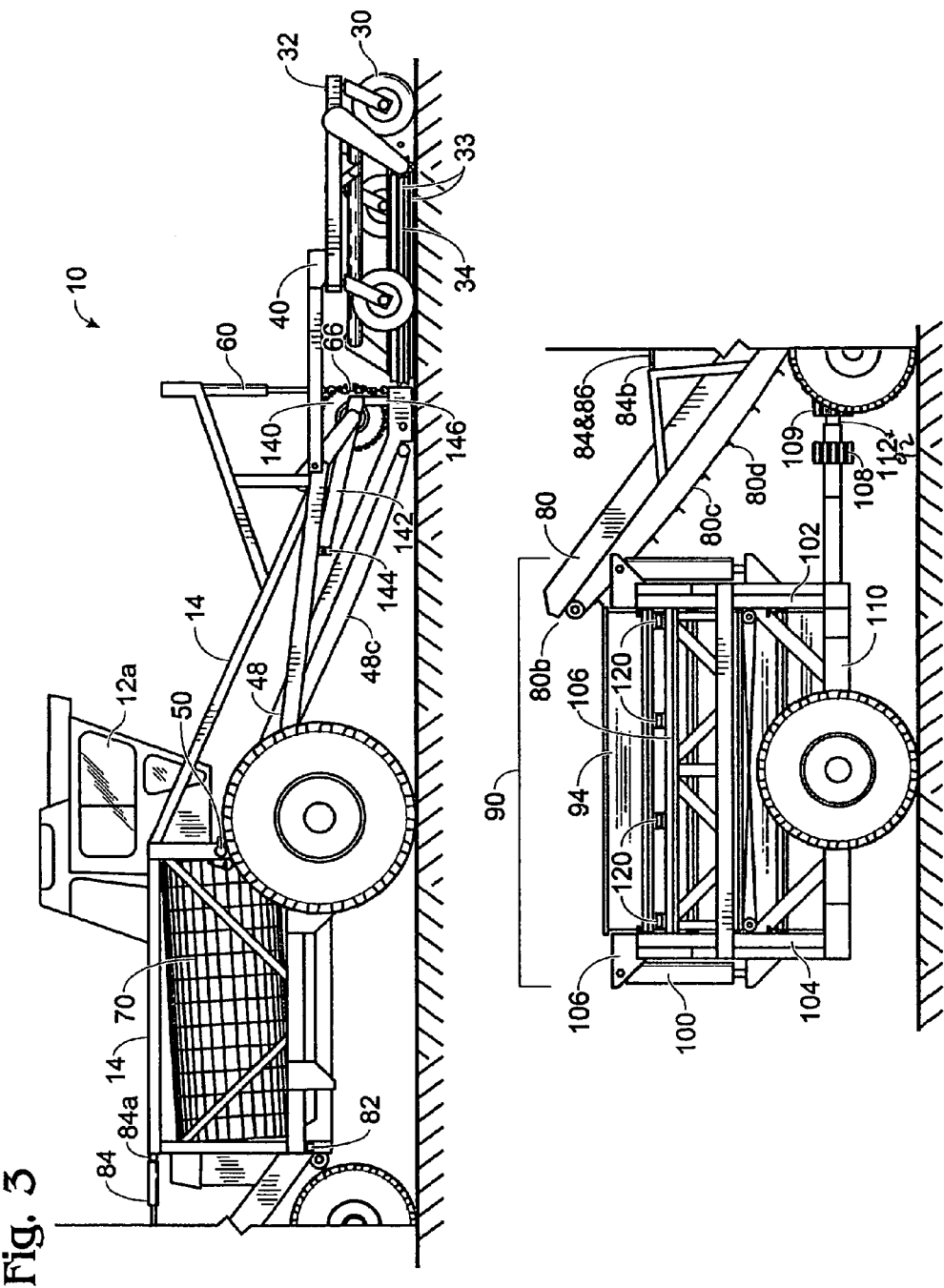
FIG. 3 shows a side view of a rock picker system mounted to a prime mover including an articulated rock box.

The following list of reference numbers used in the Drawings is provided for convenience:
10 ROCK PICKER SYSTEM
12 PRIME MOVER
12a PRIME MOVER CAB
14 FORWARD SUPPORT FRAME
14a LEFT WINDROW ROLLER LOCKING HASP
14b RIGHT WINDROW ROLLER LOCKING HASP
16 PRIME MOVER ENGINE
18 RESERVOIR TANK
20 HYDRAULIC POWER SUPPLY
22 WINDROW ASSEMBLY
22a LEFT WINDROW ASSEMBLY
22b RIGHT WINDROW ASSEMBLY
23a LEFT WINDROW ROLLER FOLDING LOCK
23b RIGHT WINDROW ROLLER FOLDING LOCK
24a LEFT WINDROW SUPPORT FRAME REMOVABLE HINGE PIN
24b RIGHT WINDROW SUPPORT FRAME REMOVABLE HINGE PIN
25a LEFT WINDROW CROSS BRACE
25b RIGHT WINDROW CROSS BRACE
26a LEFT WINDROW SUPPORT FRAME
26b RIGHT WINDROW SUPPORT FRAME
28a LEFT WINDROW ROLLER HEIGHT ADJUSTMENT
28b RIGHT WINDROW ROLLER HEIGHT ADJUSTMENT
29a LEFT WINDROW SUPPORT FRAME HINGE CONNECTOR
29b RIGHT WINDROW SUPPORT FRAME HINGE CONNECTOR
30 ROAD WHEELS
32 CASTER CONNECTORS
33 WINDROW ROLLER RIDGES
34a LEFT WINDROW ROLLER
34b RIGHT WINDROW ROLLER
35a LEFT WINDROW SUPPORT SHAFT
35b RIGHT WINDROW SUPPORT SHAFT
36a LEFT WINDROW ROLLER HYDRAULIC DRIVE
36b RIGHT WINDROW ROLLER HYDRAULIC DRIVE
38a LEFT WINDROW HINGE JOINT
38b RIGHT WINDROW HINGE JOINT
40 CENTRAL SUPPORT FRAME
41 CENTRAL SUPPORT FRAME HINGE CONNECTORS
42 COLLECTOR
48 FEED CONVEYOR
48a FEED CONVEYOR FORWARD INLET
48b FEED CONVEYOR AFT DISCHARGE
48c FEED CONVEYOR ENDLESS BELT
48d FEED CONVEYOR IDLER
50 FEED CONVEYOR HINGE CONNECTOR
52 FEED CONVEYOR FRONT ROLLER
54 FEED CONVEYOR PARASITIC DRIVE
56 FEED CONVEYOR HYDRAULIC DRIVE
60 COLLECTOR HEIGHT ADJUST LEFT CYLINDER
60a LEFT CYLINDER FIRST END
60b LEFT CYLINDER SECOND END
62 COLLECTOR HEIGHT ADJUST RIGHT CYLINDER
62a RIGHT CYLINDER FIRST END
62b RIGHT CYLINDER SECOND END
66 COLLECTOR CONNECTION MEANS
70 DRUM SEPARATOR
70a DRUM SEPARATOR FORWARD INLET END
70b DRUM SEPARATOR AFT DISCHARGE END
72 DRUM SEPARATOR LONGITUDINAL SLATS
74 DRUM SEPARATOR BLADES
76 DRUM SEPARATOR DRIVE
80 TRANSFER CONVEYOR 80a TRANSFER CONVEYOR FORWARD INLET END
80b TRANSFER CONVEYOR AFT DISCHARGE END
80c TRANSFER CONVEYOR BELT
80d TRANSFER CONVEYOR BELT LIFTING PLATES
82 TRANSFER CONVEYOR HINGE CONNECTOR
84 TRANSFER CONVEYOR LEFT PIVOT CYLINDER
84a LEFT PIVOT CYLINDER FIRST END
84b LEFT PIVOT CYLINDER SECOND END
86 TRANSFER CONVEYOR RIGHT PIVOT CYLINDER
86a RIGHT PIVOT CYLINDER FIRST END
86b RIGHT PIVOT CYLINDER SECOND END
88 TRANSFER CONVEYOR HYDRAULIC DRIVE
90 DUMP TRAILER
92 PRIME MOVER TOWING HITCH
94 ROCK BOX
98 DUMP TRAILER FORWARD LIFT CYLINDER
98a DUMP TRAILER FORWARD LIFT CYLINDER FIRST CONNECTION
98b DUMP TRAILER FORWARD LIFT CYLINDER SECOND CONNECTION
100 DUMP TRAILER AFT LIFT CYLINDER
100a DUMP TRAILER AFT LIFT CYLINDER FIRST CONNECTION
100b DUMP TRAILER AFT LIFT CYLINDER SECOND CONNECTION
102 ROCK BOX FORWARD GUIDE RAIL
104 ROCK BOX AFT GUIDE RAIL
106 LIFT FRAME
108 DUMP TRAILER HYDRAULIC CONNECTORS
109 PRIME MOVER HYDRAULIC CONNECTORS
110 DUMP TRAILER FRAME
112 DUMP TRAILER TOWING HITCH
116 DUMP TRAILER FORWARD TILT CYLINDER
116a DUMP TRAILER FORWARD TILT CYLINDER FIRST CONNECTION
116b DUMP TRAILER FORWARD TILT CYLINDER SECOND CONNECTION
118 DUMP TRAILER AFT TILT CYLINDER
118a DUMP TRAILER AFT TILT CYLINDER FIRST CONNECTION
118b DUMP TRAILER AFT TILT CYLINDER SECOND CONNECTION
120 ROCK BOX HINGE CONNECTORS
122 FIRST ALIGNMENT CABLE
122a FIRST ALIGNMENT CABLE FIRST END
122b FIRST ALIGNMENT CABLE SECOND END
124 SECOND ALIGNMENT CABLE
124a SECOND ALIGNMENT CABLE FIRST END
124b SECOND ALIGNMENT CABLE SECOND END
126 FORWARD DOUBLE PULLEY
126a FORWARD PULLEY INNER PULLEY
126b FORWARD PULLEY OUTER PULLEY
128 AFT DOUBLE PULLEY
128a AFT PULLEY INNER PULLEY
128b AFT PULLEY OUTER PULLEY
140 FEED WHEEL
142 FEED WHEEL ARM
144 FEED WHEEL HINGE CONNECTOR
146 FEED WHEEL ADJUSTABLE SUPPORT BLOCKS
148 FEED WHEEL HYDRAULIC DRIVE
150 HYDRAULIC CONTROL VALVE BLOCK MANIFOLDS
150a FIRST VALVE BLOCK MANIFOLD
150b SECOND VALVE BLOCK MANIFOLD
150c THIRD VALVE BLOCK MANIFOLD
150d FOURTH VALVE BLOCK MANIFOLD
150e FIFTH VALVE BLOCK MANIFOLD
152 CONTROL PANEL
154 VOLTAGE SUPPLY
156 EMERGENCY STOP SWITCH
160 LEFT WINDROW HEIGHT ADJUST HYDRAULIC CONTROL VALVE
162 RIGHT WINDROW HEIGHT ADJUST HYDRAULIC CONTROL VALVE
164 COLLECTOR HEIGHT ADJUSTMENT CYLINDERS HYDRAULIC CONTROL VALVE
166 TRANSFER CONVEYOR PIVOT CYLINDERS HYDRAULIC CONTROL VALVE
168 LEFT WINDROW ROLLER DRIVE HYDRAULIC CONTROL VALVE
170 RIGHT WINDROW ROLLER DRIVE HYDRAULIC CONTROL VALVE
172 FEEDWHEEL DRIVE HYDRAULIC CONTROL VALVE
174 FEED CONVEYOR DRIVE HYDRAULIC CONTROL VALVE
176 DRUM SEPARATOR DRIVE HYDRAULIC CONTROL VALVE
178 TRANSFER CONVEYOR DRIVE HYDRAULIC CONTROL VALVE
180 ROCK BOX LIFT CYLINDERS HYDRAULIC CONTROL VALVE
182 ROCK BOX TILT CYLINDERS HYDRAULIC CONTROL VALVE
190 LEFT WINDROW HEIGHT ADJUST HYDRAULIC SPEED CONTROL VALVE
192 RIGHT WINDROW HEIGHT ADJUST HYDRAULIC SPEED CONTROL VALVE
194 COLLECTOR HEIGHT ADJUSTMENT CYLINDERS HYDRAULIC SPEED CONTROL VALVE
196 TRANSFER CONVEYOR PIVOT CYLINDERS HYDRAULIC SPEED CONTROL VALVE
198 LEFT WINDROW ROLLER DRIVE HYDRAULIC SPEED CONTROL VALVE
200 RIGHT WINDROW ROLLER DRIVE HYDRAULIC SPEED CONTROL VALVE
202 FEEDWHEEL DRIVE HYDRAULIC SPEED CONTROL VALVE
204 FEED CONVEYOR DRIVE HYDRAULIC SPEED CONTROL VALVE
206 DRUM SEPARATOR DRIVE HYDRAULIC SPEED CONTROL VALVE
208 TRANSFER CONVEYOR DRIVE HYDRAULIC SPEED CONTROL VALVE
210 ROCK BOX LIFT CYLINDERS HYDRAULIC SPEED CONTROL VALVE
212 ROCK BOX TILT CYLINDERS HYDRAULIC SPEED CONTROL VALVE
220 LEFT WINDROW HEIGHT ADJUST HYDRAULIC CONTROL VALVE CONTROL SWITCH
222 RIGHT WINDROW HEIGHT ADJUST HYDRAULIC CONTROL VALVE CONTROL SWITCH
224 COLLECTOR HEIGHT ADJUSTMENT CYLINDERS HYDRAULIC CONTROL VALVE CONTROL SWITCH
226 TRANSFER CONVEYOR PIVOT CYLINDERS HYDRAULIC CONTROL VALVE CONTROL SWITCH
228 LEFT WINDROW ROLLER DRIVE HYDRAULIC CONTROL VALVE CONTROL SWITCH
230 RIGHT WINDROW ROLLER DRIVE HYDRAULIC CONTROL VALVE CONTROL SWITCH 232 FEEDWHEEL DRIVE HYDRAULIC CONTROL VALVE CONTROL SWITCH
234 FEED CONVEYOR DRIVE HYDRAULIC CONTROL VALVE CONTROL SWITCH
236 DRUM SEPARATOR DRIVE HYDRAULIC CONTROL VALVE CONTROL SWITCH
238 TRANSFER CONVEYOR DRIVE HYDRAULIC CONTROL VALVE CONTROL SWITCH
240 ROCK BOX LIFT CYLINDERS HYDRAULIC CONTROL VALVE CONTROL SWITCH
242 ROCK BOX TILT CYLINDERS HYDRAULIC CONTROL VALVE CONTROL SWITCH
D GAP DISTANCE BETWEEN FEED CONVEYOR 48 AND FEED CONVEYOR FRONT ROLLER 52
H GAP HEIGHT BETWEEN FEED WHEEL 140 AND FEED CONVEYOR FRONT ROLLER 52

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy. In order to reduce clutter and render the drawings more readable, not every component is shown in each view.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Referring to FIGS. 1-10, an improved self-propelled, transportable, rock picker system is provided and includes a prime mover, the prime mover including an operator's cab and towing means; a hydraulic power supply mounted to the prime mover; windrow means detachably and foldingly mounted to and extending forward from the prime mover, for agitating soil and causing rocks to move toward centrally mounted collector means; collector means mounted to the prime mover for collecting the rocks from the windrow means and moving the rocks to separator means; separator means mounted to the prime mover for receiving the rocks from the collector means and separating rocks from soil and moving the rocks to transfer means; transfer means mounted to the prime mover for receiving rocks from the separator means and transferring the rocks to dump trailer means; dump trailer means detachably connectable to the prime mover towing means for receiving and storing rocks from the transfer means, transporting the rocks to an offloading location, and offloading the rocks; hydraulic power distribution means for hydraulically connecting the hydraulic power supply to at least the windrow means, the collector means, the separator means, the transfer means, and the dump trailer means, the hydraulic power distribution means including remotely operated hydraulic control valves; and, control means for controlling at least the hydraulic power supply, the hydraulic power distribution means, the windrow means, the collector means, the separator means, the transfer means, and the dump trailer means.

Referring again to FIGS. 1-10, an embodiment of an improved rock picker system 10 is shown. Prime mover 12 preferably is a combine tractor powered by engine 16. Prime mover 12 includes an operator cab 12a and rear mounted towing means 92, preferably a standard towing hitch of adequate load capacity. Hydraulic power supply 20 is coupled to the output of engine 16 at the back end of engine 16. Alternatively, hydraulic power supply 20 could also be coupled to engine 16 through a power-take-off (PTO), through a separate transmission, or could be powered by a separate auxiliary power unit (APU).

Referring again to FIG. 7, hydraulic power supply 20 includes a hydraulic supply pump, reduction gear for coupling the pump to the output shaft of engine 16, a reservoir tank 18, and other necessary pressure regulators, relief valves, pressure gages, etc., which are routine for such devices and therefore not shown in detail. Hydraulic power supply 20 may also include an internal bypass valve interlocked with the starting circuit of engine 16 so that engine 16 does not have to start under full load. In an embodiment engine 16 is a diesel engine rated at 245 hp and hydraulic power supply 20 includes a hydraulic pump rated at 90 gpm.

As shown in FIGS. 1, 3, 5, 6, and 9, forward support frame 14 is mounted to prime mover 12 and extends forward of prime mover 12. Preferably forward support frame 14 is removably mounted, but may be permanently mounted by welding as well. Removably mounting forward support frame 14 allows conversion of the prime mover for different uses, and allows disassembly for long-term storage. Windrow latches 14a and 14b, preferably attached to forward support frame 14, provide locking means in combination with latches 23a and 23b for locking left and right windrow assemblies, 22a & b respectively, in the folded stowed position. Preferably latches 14a & b and 23a & b are simple hasp plates with cotter pins. In this way windrow assemblies 22a & b may be locked in the folded position, but the rock picker system can still be driven with windrow assemblies 22a & b folded due to caster-style road wheels and connectors 30 & 32. Central support frame 40 is connected to forward support frame 14 by hinge connectors 41. Hinge connectors 41 allow flex between central support frame 40 and forward support frame 14 when traveling over uneven ground. Preferably hinge connectors 41 consist of sturdy hinge pins which can be disconnected for easy disassembly. Central support frame 40 includes at least one, and preferably two, road wheels 30 for support during operation. Road wheels 30 are preferably "caster-style" wheels with vertical rotating caster connectors 32, so that they can swivel 360 degrees for greater maneuverability.

Windrow assembly 22 includes left and right windrow assemblies 22a & b, respectively. Windrow assemblies 22a & b extend in a forward-swept orientation, like a chevron with the open end forward, from central support frame 40 so as to urge material toward centrally mounted collector 42. Left and right windrow assemblies 22a & b include, respectively, left and right windrow support frames 26a & b riding on roadwheels 30 and caster connectors 32. Windrow support frames 26a & b are tied to central support frame 40 by crossbraces 25a & b, respectively. Crossbraces 25a & b are connected to central support frame 40 by removable pin connectors 24a & b, and are connected to windrow support frames 26a & b, respectively, by removable hinge connectors 29a & b. Left and right windrow support frames include road wheels 30 connected by caster connectors 32 for support and maneuverability. Preferably each of windrow support frames 26a & b are supported by at least two roadwheels 30 for stability. Pin connectors 24a & b and 29a & b are removable to permit folding and stowage, as described below. Windrow support frames 26a & b are preferably arranged in a "pigeon-toed" alignment, angled slightly inward, to provide better turning ability.

Left and right windrow rollers 34a & b are supported by left and right windrow roller support shafts 35a & b. Left and right windrow roller hydraulic drives 36a & b are preferably mounted at the outside ends of windrow assemblies 22a & b for easy maintenance access. Preferably windrow roller hydraulic drives 36a & b are coupled to windrow rollers 34a & b using chain drives for compactness and to allow for minor misalignments and movement, but other coupling methods could be used. Windrow roller hydraulic drives 36a & b are preferably reversible and operable at variable speeds. Windrow rollers 34a & b preferably include longitudinal ridges 33 which assist in penetrating into and agitating the soil and rocks as they rotate.

Figure 6:
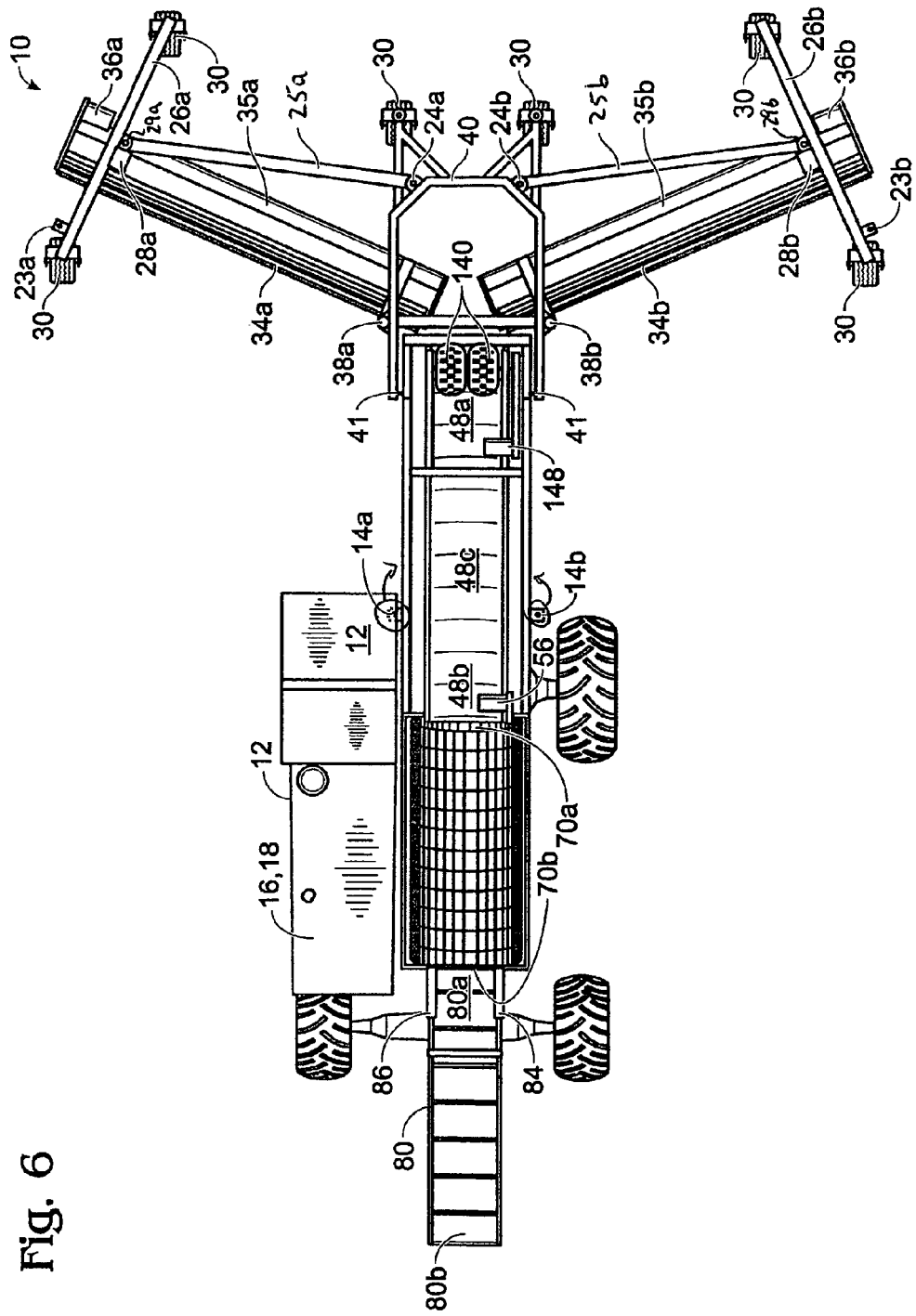
FIG. 6 shows a top view of a rock picker system.

Windrow roller support shafts 35a & b connect to central support frame 40 by hinge joints 38a & b respectively. Windrow roller support shafts 35a & b connect near their outer ends to windrow support frames 26a & b, respectively, by means of windrow height adjusters 28a & b. Hinge joints 38a & b are preferably located aft of hinge pins 24a & b, so that windrow support frames 26a & b are not parallel with windrow roller support shafts 35a & b, when viewed from overhead, as shown in FIG. 6. This creates a triangle between connection points 24a/b, 29a/b and 38a/b for strength and stability.

Referring to FIG. 6, windrow folding means are demonstrated. An operator simply disconnects pins 24a & b and pushes windrow support frames 26a & b back. Windrow assemblies 22a & b rotate about their respective hinge joints 38a & b and are locked in their folded position using locking means 23a & b and 14a & b, for left and right windrows 22a & b, respectively.

Windrow roller height adjustment means 28a & b preferably consist of simple hydraulic piston-and-cam arrangements, wherein hydraulic cylinders push cams (or levers) on the respective windrow support shafts 35a & b to cause them to rotate, thereby causing windrow rollers 34a & b to raise or to dig deeper into the soil. In this regard, "height" adjustment includes a range from maximum height above the soil to maximum penetration into the soil. Windrow height adjustment means 28a & b also provide the connection between windrow roller support shafts 35a & b and windrow support frames 26a & b.

Again referring to FIGS. 1-3, 5, 6, 7 and 9, an embodiment includes a collector 42 for receiving rocky soil from windrow rollers 34a & b. Collector 42 includes feed conveyor 48, feed wheel 140, and collector left and right height adjustment cylinders 60 & 62, respectively. Feed conveyor 48 mounts to prime mover 12 by hinge connection 50. Feed conveyor 48 preferably includes an endless conveyor belt 48c. Feed conveyor 48 is powered by feed conveyor hydraulic drive 56. Preferably feed conveyor hydraulic drive 56 is reversible and operable at variable speeds. Feed conveyor 48 is aligned longitudinally to receive rocky soil at its forward inlet 48a and discharge rocky soil at its aft discharge end 48b to drum separator 70. Feed conveyor 48 preferably includes front roller 52 mounted forward of feed conveyor inlet 48a at a selected gap distance D. Preferably gap distance D is at least ¼ inch (6 mm) to allow adequate clearance. Front roller 52 is preferably power-rotated through parasitic drive 54 receiving power through feed conveyor idler 48d. Front roller 52 preferably is approximately as wide as feed conveyor 48, and includes longitudinal ridges similar to windrow roller ridges 33.

Feed wheel 140 is dynamically mounted above feed conveyor front roller 52 and feed conveyor inlet 48a to create variable gap height H between feed conveyor front roller 52 and feed wheel 140. "Dynamically mounted" means that feed wheel 140 is able to move vertically as different sized rocks or chunks of soil are fed in between feed conveyor front roller 52 and feed wheel 140. Feed wheel 140 is supported by feed wheel arm 142. Feed wheel arm 142 is connected to forward support frame 14 by feed wheel hinge connector 144, such that feed wheel 140 is cantilevered forward and is free to rotate up and down about hinge connector 144 like a jaw. Feed wheel arm 142 rests on blocks 146 when down, to ensure the desired minimum gap height H is maintained. Blocks 146 are mounted to feed conveyor 48 and so move up or down with feed conveyor 48. Preferably the minimum gap height H is between 1.5 to 2 inches (37-50 mm), or approximately the size of the rocks desired to be removed such that the material will be gripped between feed wheel 140 and front roller 52 to help it onto feed conveyor 48. Blocks 146 may be adjustable to vary the minimum gap height H, such as by using threaded posts, set screws, dowels or other means. Preferably the maximum gap height is approximately 2 feet (60 cm), to provide sufficient space for feed wheel 140 to "bounce up" without jamming if it encounters a large rock or obstacle, and to allow sufficient clearance to raise feed conveyor 48 clear of the ground when desired. Feed wheel 140 preferably consists of one or more pneumatic tires with heavy treads on a common axle. Alternatively, feed wheel 140 may consist of a steel roller with protruding teeth or other suitable roller, where added weight is desired to assist in breaking up chunks of soil and rock.

Feed wheel 140 is power rotated by feed wheel hydraulic drive 148. Feed wheel hydraulic drive 148 is coupled to feed wheel 140, preferably using a chain drive to allow for misalignments and movement. Feed wheel drive 148 is mounted to feed wheel arm 142 and feed wheel 140, so as to move with feed wheel 140. Preferably feed wheel hydraulic drive 148 is variable speed and reversible.

Collector 42 includes height adjustment means to lift collector 42 up and clear of the ground or to allow collector 42 to dig into the soil. Height adjustment means is provided by hydraulically actuated collector lift cylinders 60 & 62. Each of lift cylinders 60 & 62 are connected at first ends 60a & 62a, respectively, to forward support frame 14 and connected at second ends 60b & 62b, respectively, to collector lift connection means 66. Collector lift connection means 66 provide flexible connections to feed conveyor inlet end 48a. Raising or lowering feed conveyor inlet 48a relative to the ground also raises and lowers feed wheel 140 as blocks 146 will maintain feed wheel 140 at the selected gap height H. Preferably collector connection means 66 are flexible connectors such as chain, cable, or rope, which will allow feed conveyor 48 to "bounce up" as it encounters large rocks being fed into collector 42.

Referring to FIGS. 1-3, 6 and 10, a drum separator 70 is shown. Drum separator 70 preferably includes a drum separator inlet end 70a, drum separator discharge end 70b, a plurality of longitudinal slats 72, and a plurality of scoop blades 74. Drum separator 70 is aligned axially, and sloped downward from forward to aft, to urge separated material aft to transfer conveyor 80. Slats 72 are distributed evenly around the perimeter of drum separator 70, with the gap between slats 72 selected based on the minimum size of rock desired to be removed from the soil. Preferably slats 72 are spaced with approximately 2 inches (50 mm) between adjacent slats.

Scoop blades 74 are mounted to the inside surface of drum separator 70 and extend radially inward. Scoop blades 74 are arranged in circumferential rows, preferably two or three circumferential rows or rings, with multiple blades in each row, which rows are distributed along the axial length of drum separator 70. In the disclosed embodiment scoop blades 74 are arranged in two rows of 2 to 3 blades each. Scoop blades 74 are preferably mounted at an angle of attack relative to the longitudinal axis of drum separator 70 so as to urge rocks aft.

As shown in FIGS. 1-3 and 6, a transfer conveyor 80 receives rock discharged from separator drum 70 at transfer conveyor inlet end 80a and discharges rock at discharge end 80b to dump trailer 90. Transfer conveyor hydraulic drive 88 drives transfer conveyor 80. Preferably transfer conveyor 80 includes a transfer conveyor belt 80c with lifting plates 80d to facilitate lifting rocks at steeper angles to shorten the overall length of rock picker system 10. Transfer conveyor 80 connects to prime mover 12 via hinge joint 82. Preferably hinge joint 82 is separable to ease disassembly and transport.

Transfer conveyor pivoting means, for moving transfer conveyor 80 between an aft/transfer position and a forward/dumping position, preferably consists of hydraulic cylinders 84 & 86 connected at respective first ends 84a & 86a to prime mover 12 and at respective second ends 84b & 86b to transfer conveyor 80. Preferably first and second connections 84a & b and 86a & b are flexible joints, such as universal joints, to prevent damage to the cylinder or jamming if rock box 94 is inadvertently lifted while transfer conveyor 80 is in the aft/transfer position.

As shown in FIGS. 1-4c and 7-8a, dump trailer 90 receives rocks from transfer conveyor 80 for storage during operations and dumping. Dump trailer 90 includes large-capacity articulated rock box 94, preferably able to retain 10-12 cubic yards of material, mounted to trailer frame 110. Trailer frame 110 preferably includes towing hitch 112 for connecting to prime mover towing hitch 92. Rock box 94 is articulated in that it can be raised and tilted for dumping its contents. Rock box 94 is connected to lift frame 106 via hinge connectors 120. Lift frame 106 fits within forward and aft lift guide rails 102 and 104, respectively, such that lift frame 106 slides up and down within guide rails 102 and 104 when raised and lowered. "Guide rails" includes traditional rails, as well as open and closed channels or sleeves. Guide rails 102 and 104 preferably cant outward to provide clearance past the side of dump trailer frame 110 during dumping. Forward lift cylinder 98 connects at first end 98a to forward guide rail 102 and a second end 98b to the forward part of lift frame 106. Likewise, aft lift cylinder 100 connects at a first end 100a to aft guide rail 104 and a second end 100b to the aft part of lift frame 106. Preferably first and second connections 98a & b and 100a & b consist of flexible connectors, such as universal joints, to allow for movement or slight misalignments. Lift frame 106 or guide rails 102 and 104 may incorporate friction reducing bearings such as track wheels, runners made from self-lubricating plastic, or other means known in the art to reduce loads on lift cylinders 98 and 100.

Tilting means includes forward and aft tilt cylinders 116 & 118, respectively. Forward and aft tilt cylinders 116 & 118, respectively, are connected at first ends 116a & 118a to lift frame 106 and second ends 116b & 118b to rock box 94. Aft tilt cylinder 118 is not visible in the views but is identical to forward tilt cylinder 116. Preferably 116a & b and 118a & b are connected using rotating connectors to allow for the change in orientation as rock box 94 is tilted during dumping, but other methods such as sliders operating in tracks could also be used.

Figure 4:
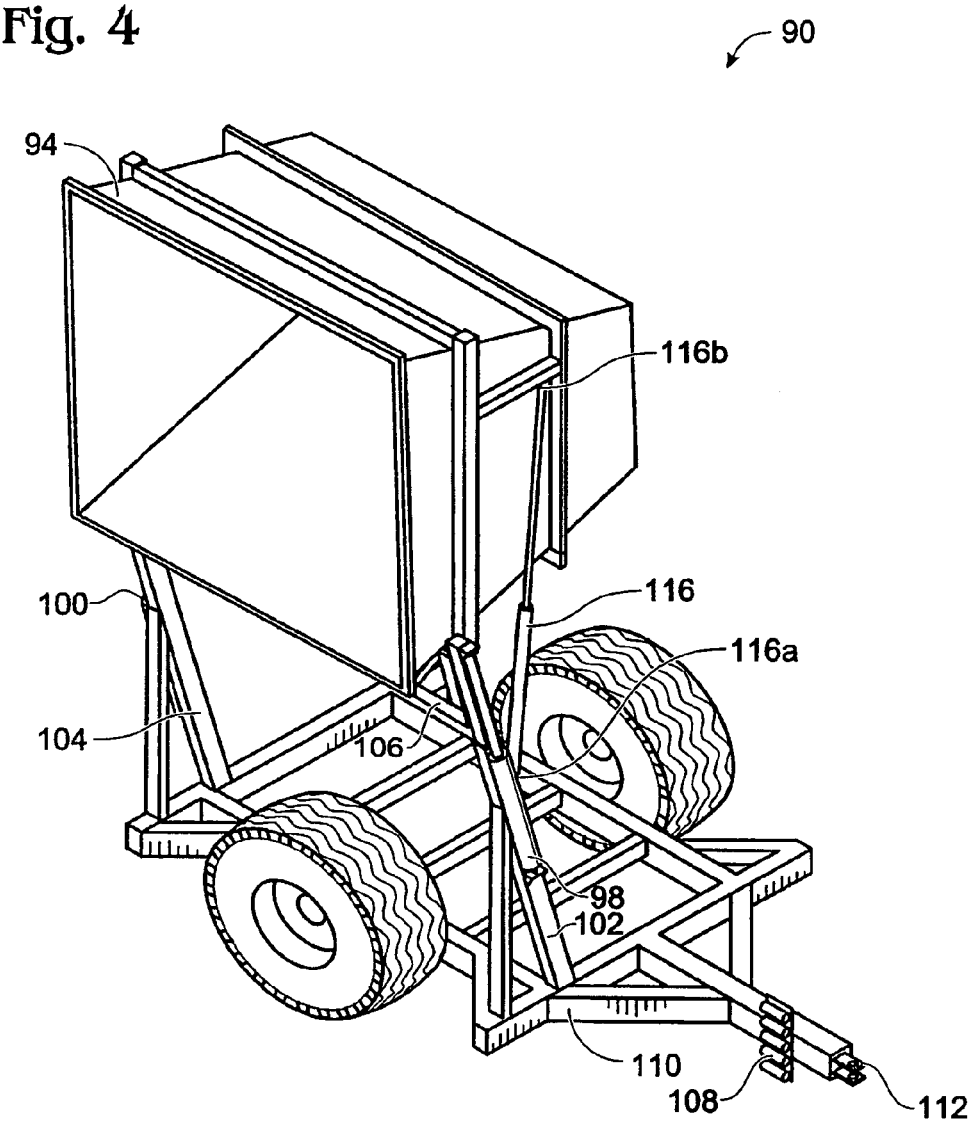
FIG. 4 shows a perspective view of a dump trailer in an elevated dumping position.
Figure 4A:
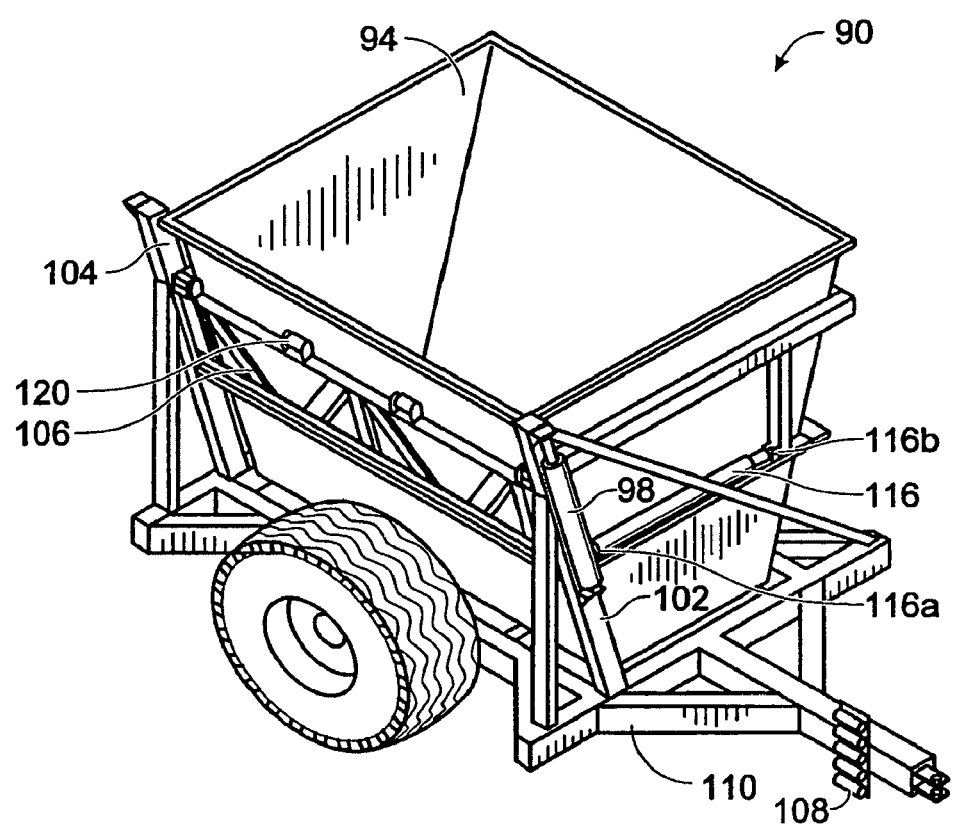
FIG. 4a shows a perspective view of a dump trailer.
Figure 4B:
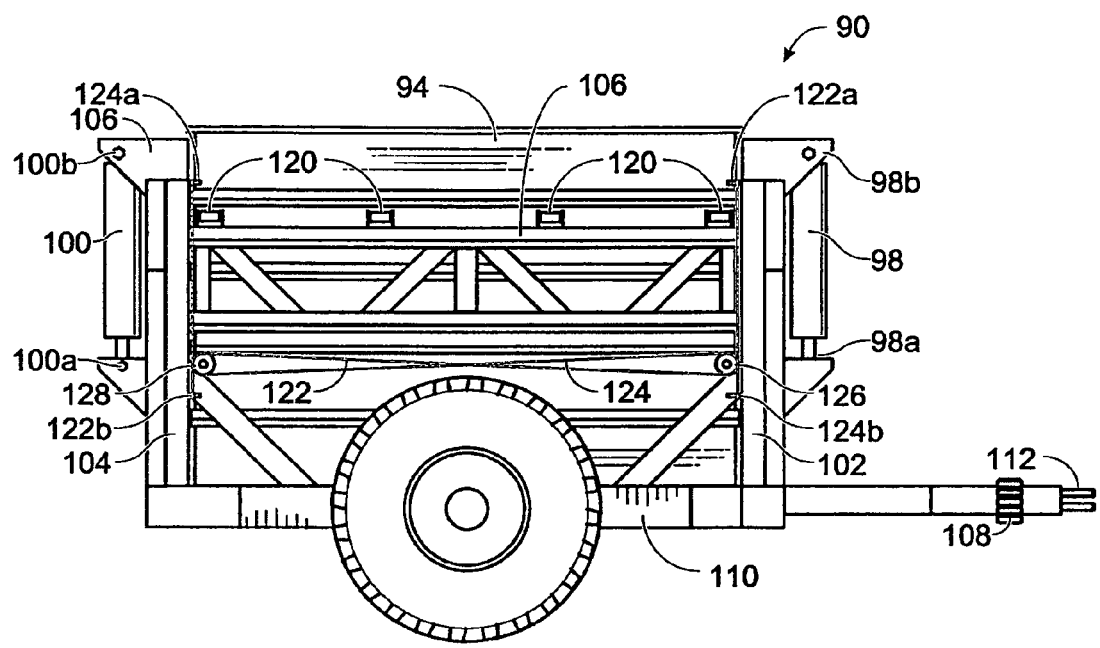
FIG. 4b shows a side view of a dump trailer.
Figure 4C:
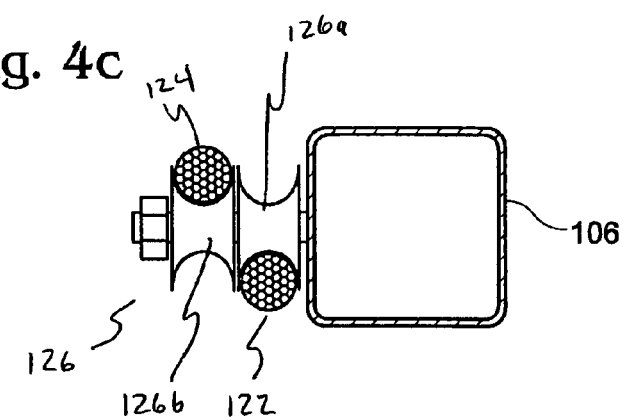
FIG. 4c shows a detail view of alignment pulleys on a dump trailer.
Figure 5:
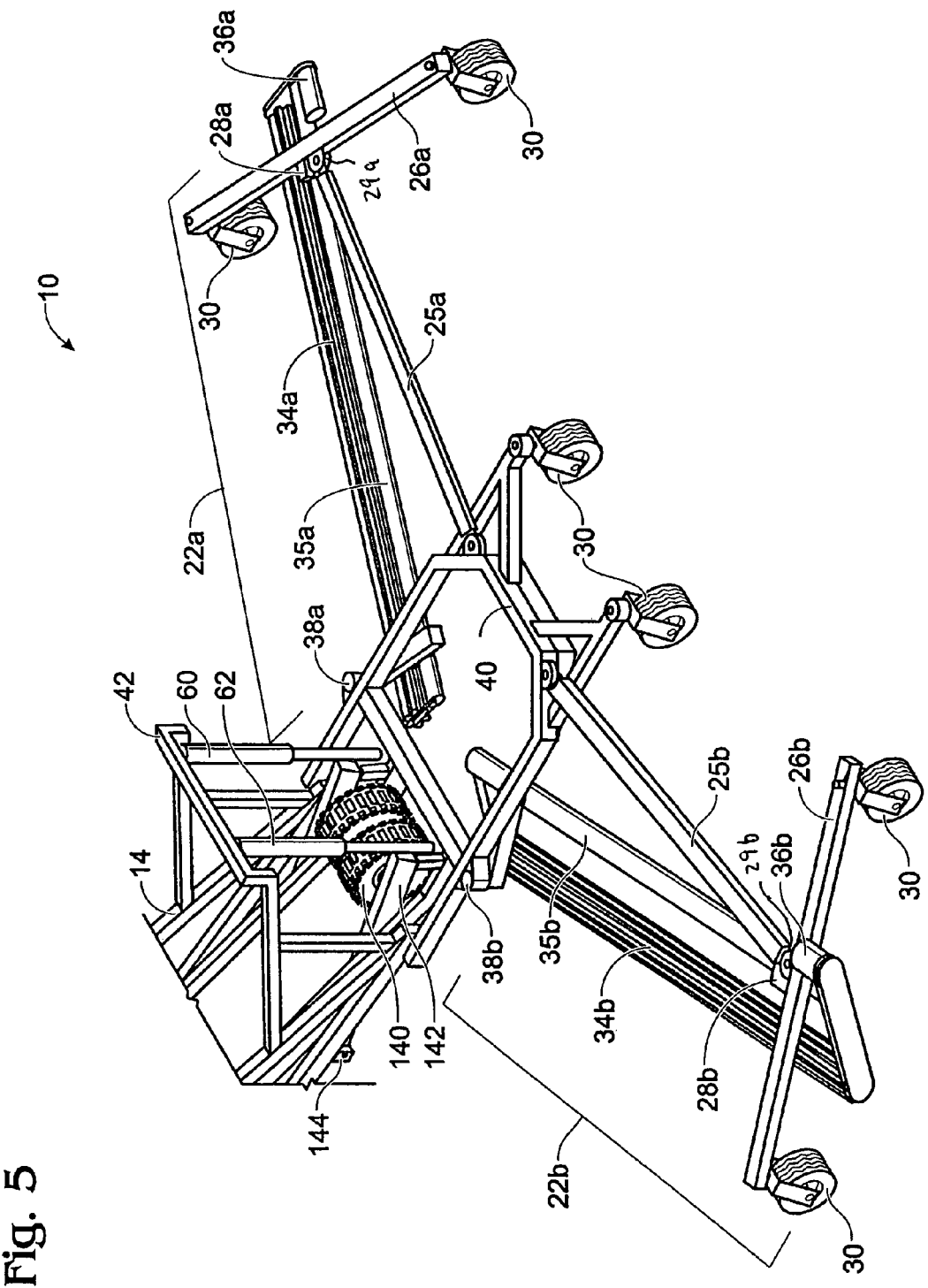
FIG. 5 shows perspective view of a forward portion of a rock picker system.

As shown in FIGS. 4-4c, an embodiment includes first and second alignment cables 122 and 124. First alignment cable 122 is connected at a first end 122a to the upper end of forward guide rail 102 and at a second end 122b to the aft bottom end of aft guide rail 104. First alignment cable 122 is routed under forward double pulley 126 and over aft double pulley 128 under tension. Second alignment cable 124 is arranged in an opposing manner: connected at a first end 124a to the upper end of aft guide rail 104 and at a second end 124b to the bottom end of forward guide rail 102. Second alignment cable 124 is routed under forward double pulley 126 and over aft double pulley 128. Double pulleys 126 and 128, each include a pair of stacked coaxially mounted outer and inner pulleys, which can rotate independently and are mounted to lifting frame 106 level with each other, moving up and down with rock box 94. In this embodiment, "outer pulley" refers to the pulley distal from frame 106, and "inner pulley" refers to the pulley proximal to frame 106. Each of alignment cables 122 & 124 are routed through the inner or outer set of pulleys, respectively. Therefore, first alignment cable 122 is routed under inner pulley 126a, and over inner pulley 128a. Second alignment cable 124 is routed over outer pulley 126b, and under outer pulley 128b. In this way, if lifting frame 106 begins to misalign during lifting, e.g. due to one lift cylinder sticking, the counteracting tension of alignment cables 122 & 124 acting on pulleys 126 & 128 will balance and maintain lifting frame 106 in proper alignment with guide rails 102 and 104.

Hydraulic connectors 108 are provided to connect lift cylinders 98 & 100 and tilt cylinders 116 & 118 to hydraulic power supply 20. Preferably hydraulic connectors 108 are quick disconnects, and corresponding quick disconnects 109 are provided on prime mover 12.

Individually operated and adjustable hydraulic drives and hydraulic lift mechanisms permit great improvements in efficiency and safety. Additionally, individually operated hydraulic components allow maintenance and modification to individual components without effect on other components and the system as a whole, because system components are not mechanically linked together in fixed gearing ratios. An embodiment including simple control means is shown schematically in FIGS. 7-8a. Hydraulic power supply 20 is in fluid communication with hydraulic loads: left windrow height adjustment 28a, right windrow roller height adjustment 28b, collector height adjustment cylinders 60 and 62 (collectively), left and right transfer conveyor pivot cylinders 84 and 86 (collectively), left windrow roller drive 36a, right windrow roller drive 36b, feed wheel drive 148, feed conveyor drive 56, drum separator drive 76, transfer conveyor drive 88, rock box lift cylinders 98 and 100 (collectively), and rock box tilt cylinders 116 and 118 (collectively).

Control of individual hydraulic loads is provided by remotely operated hydraulic control valves 160 through 182, to provide remote start/stop control of corresponding hydraulic loads as shown: control valve 160 controls left windrow height adjustment 28a; control valve 162 controls right windrow roller height adjustment 28b; control valve 164 controls collector height adjustment cylinders 60 and 62 (collectively); control valve 166 controls left and right transfer conveyor pivot cylinders 84 and 86 (collectively); control valve 168 controls left windrow roller drive 36a; control valve 170, controls right windrow roller drive 36b; control valve 172 controls feed wheel drive 148; control valve 174 controls feed conveyor drive 56; control valve 176 controls drum separator drive 76; control valve 178 controls transfer conveyor drive 88; control valve 180 controls rock box lift cylinders 98 and 100 (collectively); and, control valve 182 controls rock box tilt cylinders 116 and 118 (collectively). As shown schematically in FIG. 7, remotely operated hydraulic control valves 160 through 182 may be mounted and plumbed through valve manifold blocks 150a-e, with several similarly-sized valves mounted to each valve manifold block 150a-e. Alternatively, valves could be mounted individually or plumbed on a single manifold block, depending on preference.

Figure 7:
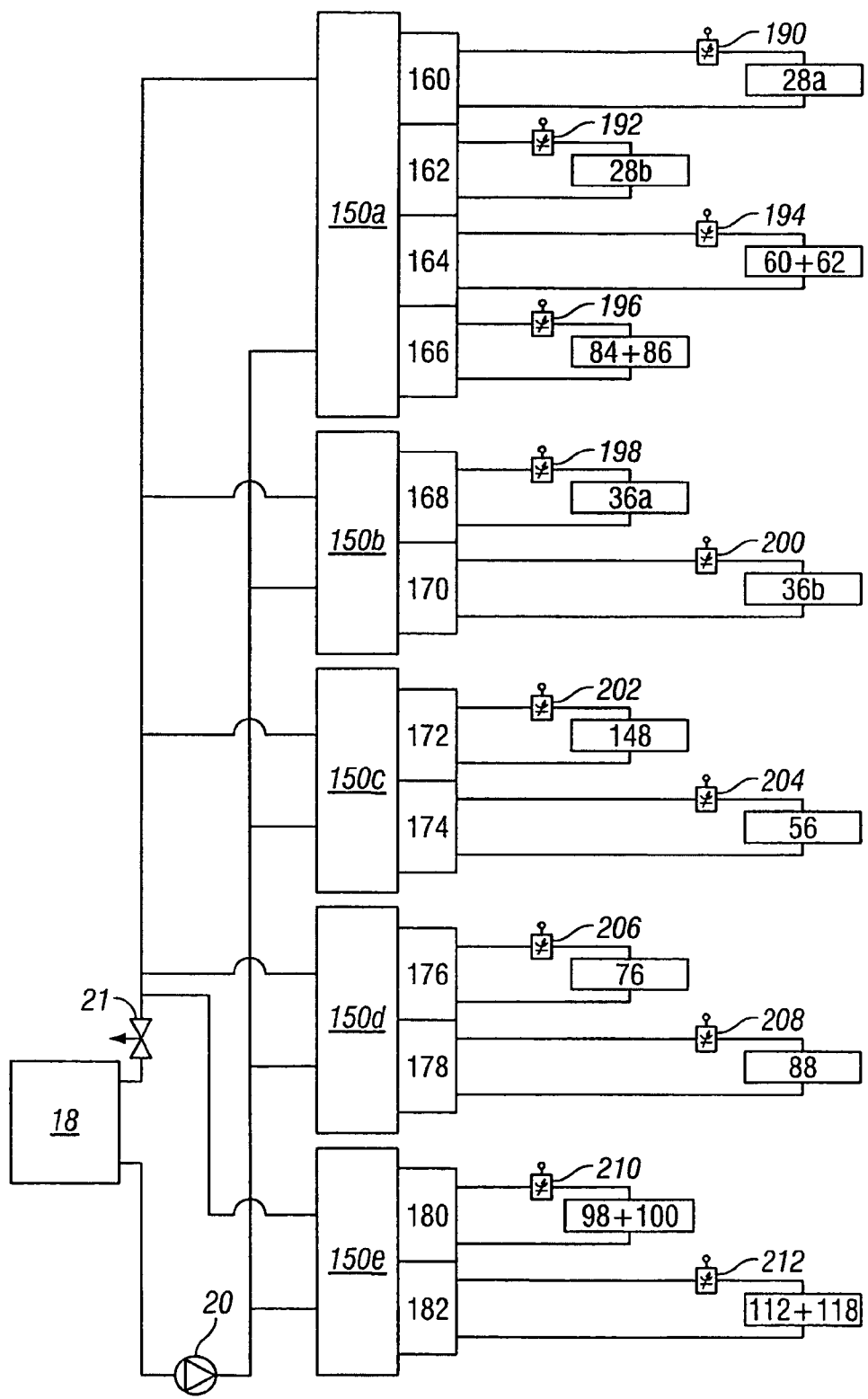
FIG. 7 shows a schematic representation of a hydraulic distribution and control system for a rock picker utilizing a power-take-off (PTO).
Figure 7A:
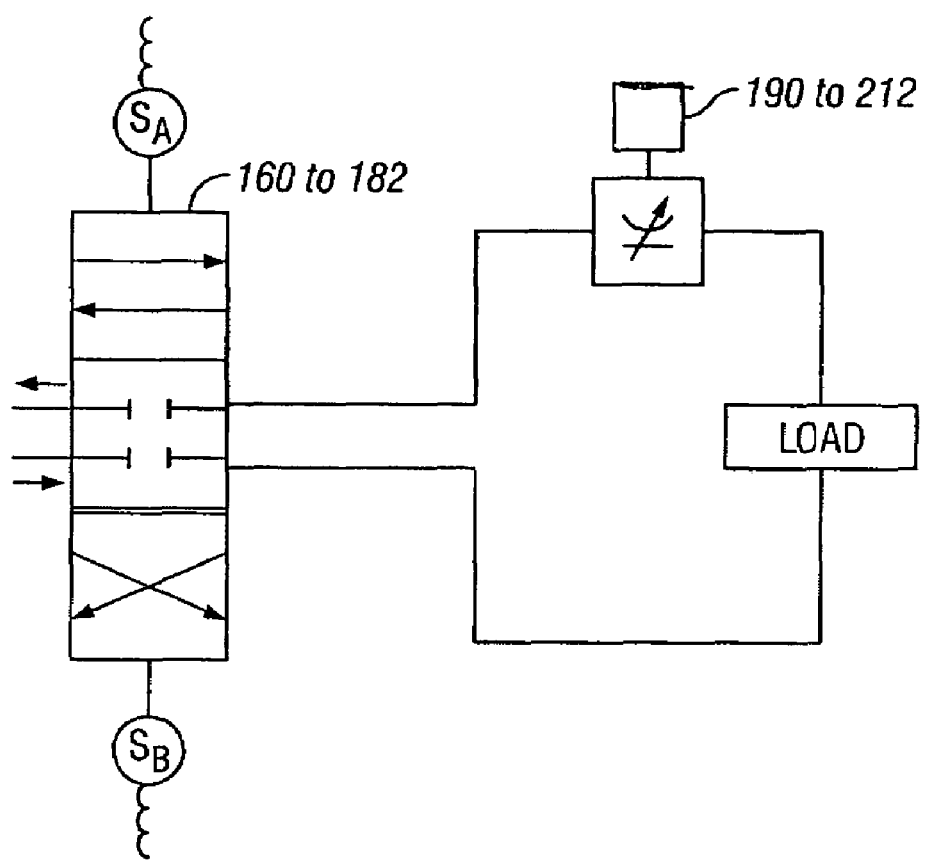
FIG. 7a shows a schematic representation of a hydraulic distribution and control system for a rock picker system.
Figure 8:
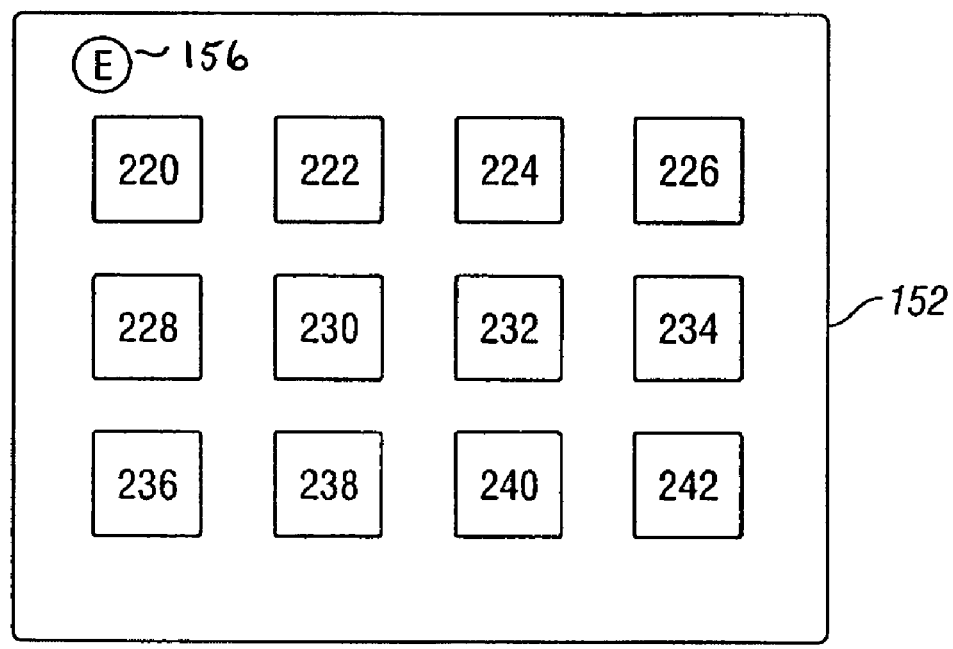
FIG. 8 shows a schematic layout of a control panel.
Figure 8A:
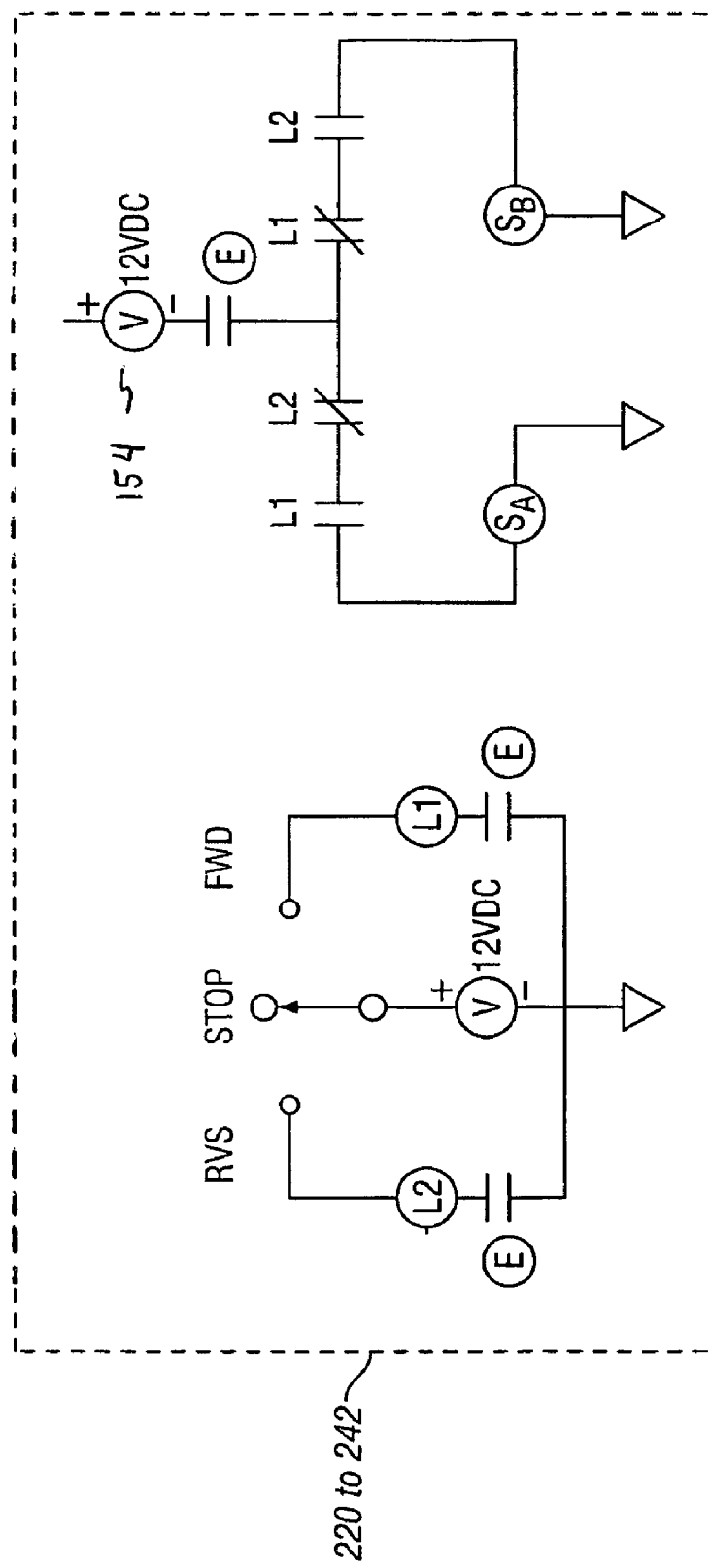
FIG. 8a shows a schematic representation of a control switch.
Figure 9:
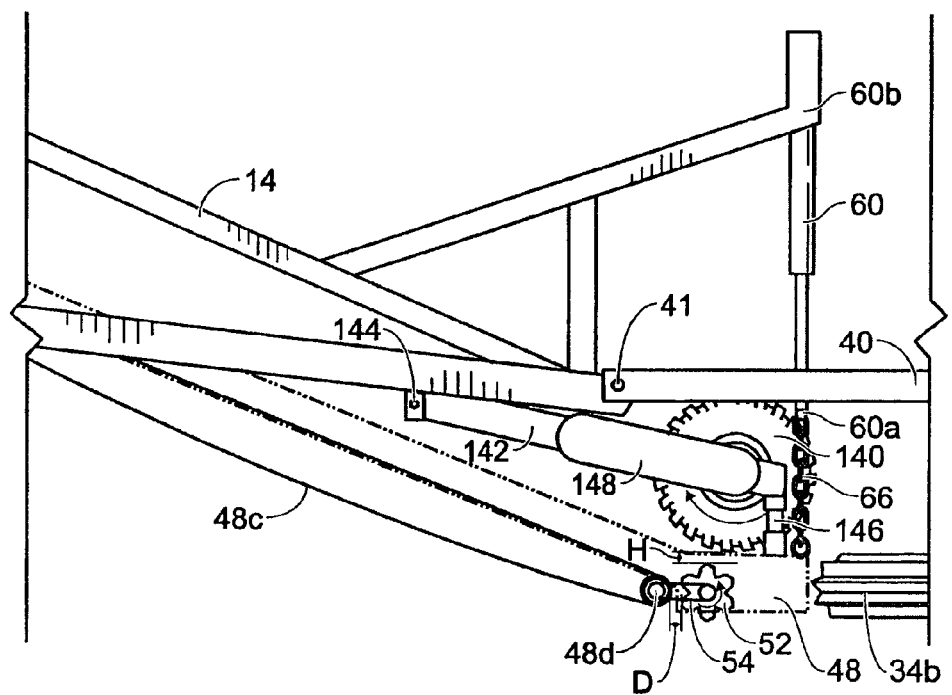
FIG. 9 shows a detail view of a feed wheel.
Figure 10:
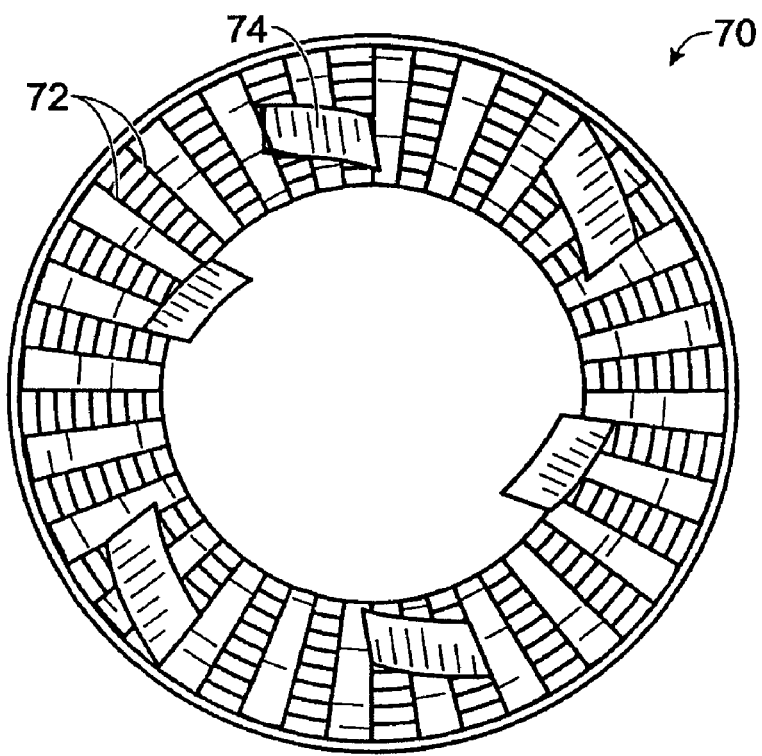
FIG. 10 shows an interior perspective view of a drum separator.

Referring to FIGS. 7-8a, in an embodiment control valves 160 through 182 are four-way three-position double solenoid valves, in order to provide compact mounting, simple control wiring, and adequate directional control. FIG. 7a provides a generic schematic for each hydraulic load. $S_A$ and $S_B$ refer to the solenoids for positioning the hydraulic control valves 160 through 182. A person of ordinary skill in the art will understand that other equivalent valving combinations could be used, e.g. using separate supply and return solenoid valves rather than a combined four way valve, or other equivalent valving arrangements. Manual isolation valves could also be provided to isolate individual hydraulic loads or manifolds.

Again referring to FIGS. 7-8a, in an embodiment, remotely operated control valves 160 through 182 are in electrical communication with control panel 152, located in operator's cab 12a. A simple control schematic is provided in FIGS. 8 and 8a. FIG. 8a provides a generic circuit schematic for simple switch controls corresponding to control switches 220 through 242, using relays L1 and L2 controlling normally open and normally closed contacts in series with solenoids $S_A$ and $S_B$ of control valves 160 through 182. Normally open contacts from emergency stop switch 156 are also included in the circuit as a typical safety measure. Three-position selector switches 220 through 242 are provided on control panel 152 to operate hydraulic control valves—and thereby their corresponding hydraulic loads—as shown: selector switch 220 corresponds to control valve 160 controlling left windrow height adjustment 28a; selector switch 222 corresponds to control valve 162 controlling right windrow roller height adjustment 28b; selector switch 224 corresponds to control valve 164 controlling collector height adjustment cylinders 60 and 62 (collectively); selector switch 226 corresponds to control valve 166 controlling left and right transfer conveyor pivot cylinders 84 and 86 (collectively); selector switch 228 corresponds to control valve 168 controlling left windrow roller drive 36a; selector switch 230 corresponds to control valve 170 controlling right windrow roller drive 36b; selector switch 232 corresponds to control valve 172 controlling feed wheel drive 148; selector switch 234 corresponds to control valve 174 controlling feed conveyor drive 56; selector switch 236 corresponds to control valve 176 controlling drum separator drive 76; selector switch 238 corresponds to control valve 178 controlling transfer conveyor drive 88; selector switch 240 corresponds to control valve 180 controlling rock box lift cylinders 98 and 100 (collectively); and, selector switch 242 corresponds to control valve 182 controlling rock box tilt cylinders 116 and 118 (collectively).

Selector switches controlling rotating hydraulic loads (i.e. windrow roller drives 36a&b, feed wheel drive 148, feed conveyor drive 56, drum separator drive 76, and transfer conveyor drive 88) thereby control direction of operation: the neutral position "N" corresponds to 0 rpm; position "A" corresponds to normal rotation direction; and, position "B" corresponds to reverse rotation direction. Selector switches controlling hydraulic cylinders (i.e. windrow height adjustment means 28a&b, collector height adjustment cylinders 60 & 62, transfer conveyor pivot cylinders 84 & 86, rock box lift cylinders 98 & 100, and rock box tilt cylinders 116 & 118) similarly control direction of movement: the neutral position "N" corresponds to locking the cylinder in place; position "A" corresponds to extending the cylinder; and, position "B" corresponds to retracting the cylinder.

Voltage supply 154, shown schematically in FIG. 8a, provides 12 vdc power to operate control valves 160 through 182 and other dc loads. Voltage supply 154 may simply be the alternator/battery circuit of engine 16 or a separate power supply. Any suitable voltage source compatible with the solenoid operated control valves 160 through 182 can be used, including ac voltage sources, but 12 vdc components are commonly used and available. Emergency stop switch 156 may be incorporated to de-energize all solenoid valves and thereby immediately stop all hydraulic loads. Control panel 152, including selector switches 220 through 242, is in electrical communication with control valves 160 through 182.

Referring again to FIGS. 7 & 7a, in an embodiment speed control for hydraulic loads is provided by throttle valves 190 through 212, corresponding to hydraulic loads as shown: control valve 190 controls left windrow height adjustment 28a; control valve 192 controls right windrow roller height adjustment 28b; control valve 194 controls collector height adjustment cylinders 60 and 62 (collectively); control valve 196 controls left and right transfer conveyor pivot cylinders 84 and 86 (collectively); control valve 198 controls left windrow roller drive 36a; control valve 200 controls right windrow roller drive 36b; control valve 202 controls feed wheel drive 148; control valve 204 controls feed conveyor drive 56; control valve 206 controls drum separator drive 76; control valve 208 controls transfer conveyor drive 88; control valve 210 controls rock box lift cylinders 98 and 100 (collectively); and, control valve 212 controls rock box tilt cylinders 112 and 118 (collectively). In an embodiment shown in FIG. 7, speed control valves 190 through 212 are manually operated needle valves installed on the return side of the hydraulic load to provide fine control. Alternative configurations could also be used, including the incorporation of the speed control adjustment mechanism into the hydraulic drives themselves.

Referring to FIGS. 1-10, the operation of an embodiment is now described for illustration. The entire system may be operated from the cab 12a of prime mover 12. The operator maneuvers prime mover 12 to the start location. Windrow assembly 22 may be unfolded prior to maneuvering to the start location, or may be left folded and locked until prime mover 12 arrives at the start location and then deployed. Hydraulic power supply 20 is coupled directly to the output of engine 16, so the hydraulic system is pressurized when engine 16 is running.

The operator, using selector switches 220 through 242 on control panel 152 (located inside operator's cab 12a) activates hydraulically driven components—windrow rollers 34a & b, feed wheel 140, feed conveyor 48, separator drum 70, and transfer conveyor 80—and sets the heights of windrow rollers 34a & b and collector 42 as desired based on anticipated soil conditions. During normal operation windrow rollers 34a & b rotate such that the bottom is traveling forward relative to prime mover 12 and the top travels backward relative to prime mover 12. This counter-rotation agitates the soil and will tend to allow loose soil to flow over the top of the rollers but cause heavier rocks to remain in front of the rollers and be urged steadily toward collector 42 located centrally aft of left and right windrow assemblies 22a & b.

The operator may adjust the rotation speed of windrow rollers 34a & b independently of the speed of prime mover 12, and independently of other components, to suit the soil conditions and the density and sizes of the rocks in the soil to be removed. Referring to FIG. 7, in an embodiment an operator may adjust speeds by operating manual throttle valves 190 through 212. The operator preferably conducts a test run over a short distance, monitoring the equipment operation and the volume and efficiency of rocks collected, and then adjusts operating speeds and heights/depths accordingly.

Center support frame 40 connects to forward support frame 14 by hinge connector 41. This allows center support frame 40 and windrow assembly 22 to flex up and down while following the undulations of the ground, thereby preventing jams and ensuring optimal performance by maintaining constant height in relation to the ground.

The rocky soil mixture urged to the center contacts collector 42. Feed conveyor front roller 52 rotates in the same direction as windrow rollers 34*a* & *b*, receiving power from parasitic drive 54 running off of idler 48*d*. Front roller 52 performs dual functions: it absorbs the shock from rocks and obstacles rather than feed conveyor 48, and it assists rocks onto feed conveyor 48. Feed wheel 140 normally rotates in the opposite direction of feed conveyor front roller 52, so as rocks and large chunks of soil are urged over top of feed conveyor front roller 52 they are grabbed between feed wheel 140 and front roller 52 and accelerated to feed conveyor inlet 48*a*. Feed wheel 140 is necessary for two reasons. First, frequently rocks are encountered which are too heavy for front roller 52, by itself, to move onto feed conveyor 48. Feed wheel 140 will grip large heavy rocks on their tops and roll them over front roller 52. Second, large chunks of soil, and occasionally large chunks of aggregated rocks, will be fed to collector 42. The pressure created between feed wheel 140 and front roller 52, from the weight of feed wheel 140, will tend to break these aggregations apart for more efficient separation, and reduces the amount of soil that must be removed by drum separator 70. Feed wheel 140 is dynamically mounted above front roller 52 and feed conveyor inlet end 48*a*, so it will automatically rise to accommodate large rocks as feed wheel arm 142 rotates around hinge connection 144.

Blocks 146 maintain a minimum gap height H between feed wheel 140 and front roller 52. This minimum gap height H is preferably approximately equal to or slightly smaller than the minimum average rock size desired to be removed so that the rocks will be positively gripped between feed wheel 140 and front roller 52 and moved to feed conveyor 48. Generally, rocks equal to or greater than approximately 2 inches (50 mm) across can damage plows and so should be removed. Preferably some loose soil will fall out in the gap between front roller 52 and feed conveyor 48, but there will still be a significant amount of soil received by feed conveyor 48 and discharged into drum separator 70.

Feed wheel 140 and feed conveyor 48 incorporate independent hydraulic drives 148 and 56, respectively, so their speeds can be adjusted independently as well, to optimize them for the conditions encountered.

Feed wheel drive 148 and feed conveyor drive 56, which also drives front roller 52, are preferably reversible so that if an object becomes jammed between feed wheel 140 and front roller 52 it can be dislodged by reversing their respective directions of rotation. Likewise, if a dangerous object was ingested onto feed conveyor 48 which could jam drum separator 70 the operator could immediately stop feed conveyor 48, and then reverse feed conveyor 48 and/or feed wheel 140 to eject the object forward, at which point it could be disposed of or maneuvered around.

Feed conveyor 48 is connected to prime mover 12 by hinge connection 50, allowing the height of collector 42 to be adjusted by raising or lowering collector height adjustment cylinders 60 & 62. This way the operator can adjust the depth of front roller 52 in the soil, independently of windrow rollers 34*a* & *b*, or raise collector 42 completely to avoid an obstacle.

Rock-soil mixture is received at feed conveyor inlet end 48*a* and discharged at feed conveyor outlet 48*b* into drum separator 70. Drum separator 70 separates rocks from soil by mechanically beating the rocks against slats 72 and scoop blades 74 to remove adhered soil, and allowing loose soil to fall out through the gaps between slats 72. The spacing between slats 72 determines the minimum size of rocks removed from the ground. The speed of drum separator hydraulic drive 76 may be varied independently of other components. The slight slope of drum separator 70 to aft urges separated rocks aft as drum separator 70 rotates. Scoop blades 74 also act to urge separated rocks aft due to their angle of attack—similar to the operation of an auger, and assist in separation by lifting and dropping aggregate chunks as the separator drum 70 rotates.

Drum separator discharge end 70*b* discharges separated rocks to transfer conveyor inlet end 80*a*. Lifting plates 80*d*, projecting outward from transfer conveyor belt 80*c*, assist in moving rocks up transfer conveyor 80 and allow a steeper slope for transfer conveyor 80 in order to clear rock box 94 with a shorter overall length. When rock box 94 is to be dumped the operator may pivot transfer conveyor 80 forward by operating transfer conveyor pivot cylinders 84 and 86.

Dump trailer 90 receives separated rock into rock box 94 from transfer conveyor 80. The large capacity of rock box 94, preferably holding 10-12 cubic yards of material, significantly increases the efficiency of the improved rock picker system over prior systems. An operator may dump accumulated rocks either into a collection container or directly onto the ground as desired. To dump rocks into a container, the operator can simply raise windrow rollers 34*a* & *b* from the ground, raise collector 42 from the ground, stop rotation of windrow rollers 34*a* & *b*, feed wheel 140, front roller 52, feed conveyor 48, drum separator 70, and transfer conveyor 80, and tow dump trailer 94 to a position side-by-side to the container. The operator then pivots transfer conveyor 80 forward by operating transfer conveyor pivot cylinder 84 & 86 in order to provide clearance for rock box 94. Rock box 94 is raised to the desired height to clear the sides of the receiving container by extending dump trailer lift cylinders 98 & 100, causing lift frame 106 to raise upward and outward along guide rails 102 & 104. The outward slant of guide rails 102 & 104 causes rock box 94 to move sideways as well, to ensure rock box 94 is clear of dump trailer frame 110 and over the receiving container when it dumps. When rock box 94 is raised to the desired height and side distance the operator extends rock box tilt cylinders 116 & 118, causing rock box 94 to rotate about hinge connectors 120, thereby dumping its contents. In order to make maneuvering close to a receiving container easier, the operator can simply raise windrow rollers 34*a* & *b*, disconnect hinge pins 24*a* & *b*, and push windrow rollers 22*a* & *b* back into the folded, locked position. An operator could also tow dump trailer 56 to a location requiring rock fill, such as a road depression or retaining wall area, and discharge rocks directly to that point, thereby eliminating a requirement for intermediate transfer to a dump truck.

After the rock is dumped the operator simply lowers the rock box 94 back into its normal position, pivots transfer conveyor 80 back to its normal position, and returns to the field being cleared. To resume operation the operator simply restarts the components, lowers the windrow rollers 34*a* & *b* and collector 42 to the desired height/depth, and continues operation.

When clearing operations are complete an operator can easily fold the improved rock picker system for transport on a flatbed truck or storage in a shed. After the operator has stopped the individual components and raised windrow rollers 34*a* & *b* and collector 42, the operator simply disconnects left and right windrow support frames 26*a* & *b* by removing hinge pins 24*a* & *b* and pushes left and right windrows 22*a* & *b* back, causing them to pivot around pivot joints 38*a* & *b*, until they are close enough to engage locking hasps 14*a* & *b* and 23*a* & *b*. Road wheels 30 on windrow support frames 26*a* & *b* swivel 360 degrees so it is easy for a single person to push windrows 22*a* & *b* back to their folded, locked position. The operator can then drive the prime mover onto a flatbed truck for transport to another location or into a storage shed.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. An improved self-propelled, transportable, rock picker system, comprising:
    a prime mover, said prime mover including an operator's cab and means for towing a dump trailer;
    windrow means detachably and foldingly mounted to and extending forward from said prime mover, for agitating soil and causing rocky soil to move toward centrally mounted collector means;
    said collector means mounted to said prime mover for collecting said rocky soil from said windrow means and moving said rocky soil to separator means;
    said separator means mounted to said prime mover for receiving said rocky soil from said collector means and separating rocks from said rocky soil and moving said rocks to transfer means;
    said transfer means mounted to said prime mover for receiving rocks from said separator means and transferring said rocks to dump trailer means;
    said dump trailer means detachably connectable to said prime mover towing means for receiving and storing rocks from said transfer means, transporting said rocks to an offloading location, and offloading said rocks;
    an hydraulic power supply mounted to said prime mover, said hydraulic power supply in fluid communication with hydraulic loads, said hydraulic loads including at least said windrow means, collector means, separator means, transfer means, and dump trailer means; and,
    control means for controlling said hydraulic power supply and said hydraulic loads.

2. The improved rock picker system of claim 1, wherein said control means includes:
    a plurality of remotely operated hydraulic control valves, wherein said control valves correspond to said hydraulic loads; and,
    a control panel mountable in said prime mover cab;
    wherein said control panel is in electrical communication with at least each of said remotely operated hydraulic control valves.

3. The improved rock picker system of claim 2, wherein said control means includes individual speed control means for controlling the speed of each of said hydraulic loads independently of the other hydraulic loads.

4. The improved rock picker system of claim 1, wherein said windrow means comprises a windrow assembly extending forward of said prime mover, said windrow assembly comprising:
    a forward support frame;
    a detachable central support frame hingedly connected to said forward support frame;
    left and right windrows foldingly and detachably connected to said central support frame, each of said left and right windrows including:
        at least one roadwheel;
        a windrow roller;
        an hydraulic drive connected to said windrow roller and in fluid communication with said hydraulic power distribution means; and
        hydraulic height adjustment means for adjusting the height of said windrow roller and in fluid communication with said hydraulic power distribution means;
    wherein said left and right windrow rollers are mounted in a forward-swept orientation so as to urge material toward the center, but can fold back toward said prime mover into a stowage position.

5. The improved rock picker system of claim 4, wherein said left and right windrow roller hydraulic drives are reversible.

6. The improved rock picker system of claim 4, wherein said central support frame includes at least one roadwheel.

7. The improved rock picker system of claim 4, wherein each of said left and right windrows further include locking means for locking said windrows in a folded stowage position.

8. The improved rock picker system of claim 1, wherein said collector means comprises:
    a feed conveyor hingedly connected to said prime mover and aligned longitudinally to receive rocky soil from said windrow means at its forward end and discharge said rocky soil to said separator means at its aft end, said feed conveyor including:
        an hydraulic drive in fluid communication with said hydraulic power distribution means,
        an inlet end
        a discharge end,
        a front roller mounted forward of said feed conveyor inlet end at a selected gap distance between said front roller and feed conveyor inlet end; and,
    a feed wheel including an hydraulic drive in fluid communication with said hydraulic power distribution means, said feed wheel dynamically mounted above the inlet end of said feed conveyor thereby creating a variable gap height between said feed wheel and said feed conveyor, such that said feed wheel is able to move vertically between a minimum gap height and a maximum gap height;

hydraulic collector height adjustment means in fluid communication with said hydraulic power distribution means for adjusting the height of said feed conveyor inlet relative to the ground; and, collector connection means for connecting said collector height adjustment means to said feed conveyor.

9. The improved rock picker of claim 8, wherein said front roller further includes a parasitic drive powered by said feed conveyor.

10. The improved rock picker system of claim 8, wherein said collector height adjustment means comprises a pair of hydraulic cylinders and a tie bar, each of said cylinders connected at a first end to said forward support frame and at a second end to said tie-bar; and, said collector connection means comprises one or flexible connectors, each of said one or more flexible connectors connected at a first end to said tie-bar and at second end to said collector means wherein said collector connection means allows said feed conveyor to rise vertically when encountering an obstacle.

11. The improved rock picker system of claim 10, wherein said connection means is selected from the group consisting of: chain, cable and rope.

12. The improved rock picker system of claim 8, wherein said feed wheel and said feed wheel hydraulic drive are reversible.

13. The improved rock picker system of claim 8, wherein said feed conveyor and feed conveyor hydraulic drive are reversible.

14. The improved rock picker system of claim 1, wherein said separator means comprises:

a drum separator including an hydraulic drive in fluid communication with said hydraulic power distribution means, said drum separator mounted longitudinally on said prime mover so as to receive rocky soil from said collector means and discharge rocks to said transfer means, wherein said drum separator slopes downward from forward to aft to encourage movement of separated rock aft during normal operation.

15. The improved rock picker system of claim 14, wherein said drum separator further comprises:
a forward inlet end,
an aft discharge end,
a plurality of longitudinal slats extending from said inlet end to said outlet end and distributed evenly around the perimeter at a selected spacing;
a plurality of scoop blades extending radially inward distributed throughout the interior of said drum separator.

16. The improved rock picker system of claim 15, wherein said scoop blades are arranged in a plurality of circumferential rows, each row including plurality of scoop blades.

17. The improved rock picker system of claim 14, wherein said drum separator and drum separator hydraulic drives are reversible.

18. The improved rock picker system of claim 1, wherein said transfer means comprises:
a transfer conveyor hingedly connected to said prime mover, said transfer conveyor including:
an hydraulic drive in fluid communication with said hydraulic power distribution means,
pivoting means in fluid communication with said hydraulic power distribution means for pivoting said transfer conveyor about said hinge connection between an aft transfer position and a forward unloading position so as to provide clearance for unloading said dump trailer means.

19. The improved rock picker system of claim 18, wherein said transfer conveyor is reversible.

20. The improved rock picker system of claim 18, wherein said pivoting means comprises at least one hydraulic cylinder in fluid communication with said hydraulic distribution means.

21. The improved rock picker system of claim 1, wherein said dump trailer means comprises:
a trailer frame connectable to said prime mover towing means;
a rock box mounted to said trailer frame for receiving separated rock material from said transfer means;
hydraulic lifting means in fluid communication with said hydraulic power distribution means for lifting said rock box to a selected height for dumping;
hydraulic tilting means in fluid communication with said hydraulic power distribution means for tilting said rock box to cause said rock material to dump from said rock box; and,
detachable hydraulic connection means for connecting said lifting means and said tilting means to said hydraulic power distribution means on said prime mover.

22. The improved rock picker system of claim 21, wherein:
said hydraulic lifting means includes:
fore and aft lift guide rails fixedly attached to said trailer frame;
a lift frame hingedly connected to said rock box and in sliding contact with said lift guide rails;
an hydraulic lift cylinder connected at a first end to said lift guide rails and at a second end to said lift frame; and,
said hydraulic tilt means includes:
an hydraulic tilt cylinder connected at one end to said lift frame and at a second end to said rock box, such that extension and contraction of said tilt cylinders will cause said rock box to rotate about said hinged connection.

23. An improved rock picker system as in claim 22, further comprising means for balancing said rock box during lift operations.

24. An improved rock picker system as in claim 23, wherein said balancing means comprises:
first and second cables;
a first double pulley mounted to said lift frame at a forward position and a second double pulley mounted to said lift frame at an aft position, each of said first and second double pulleys including an outer pulley and an inner pulley, each of said outer and inner pulley coaxial and able to rotate independently of each other;
wherein, said first cable is connected under tension at a first end to said forward guide rail and at a second end to said aft guide rail, and further wherein said first cable is routed around the bottom of said inner pulley of said first double pulley and around the top of said inner pulley of said second double pulley; and,
wherein, said second cable is connected under tension at a first end to said aft guide rail and at a second end to said forward guide rail, and further wherein said second cable is routed around the bottom of said outer pulley of said second double pulley and around the top said outer pulley of said first double pulley.

25. An improved self-propelled, transportable, rock picker system, comprising:
a prime mover including an engine, an operator cab and means for towing a dump trailer;
an hydraulic power supply;

a windrow assembly detachably mounted to said prime mover and extending in a forward-swept orientation from said prime mover so as to urge material toward a centrally mounted collector, said windrow assembly comprising:
  a forward support frame mounted to said prime mover;
  a detachable central support frame hingedly connected to said forward support frame, said central support frame including at least one roadwheel;
  left and right windrow support frames hingedly detachably connected to said central support frame, each of said left and right windrow support frames including at least one roadwheel and locking means for locking said windrow support frame in a folded stowage position; and,
  left and right windrows detachably mounted to the respective said left and right windrow support frames, each of said left and right windrows including:
    a windrow roller;
    a variable-speed, reversible, hydraulic drive coupled to said windrow roller, said hydraulic drive in fluid communication with said hydraulic power supply;
    height adjustment means for adjusting the height of said windrow roller, said height adjustment means in fluid communication with said hydraulic power supply;
  a centrally mounted collector comprising:
    a feed conveyor hingedly and detachably connected to said prime mover and aligned longitudinally to receive rocky soil from said left and right windrow rollers at a forward end and discharge said rocky soil to a separator drum at an aft end, said feed conveyor including a variable-speed reversible hydraulic drive in fluid communication with said hydraulic power supply;
    a feed wheel including a variable-speed reversible hydraulic drive in fluid communication with said hydraulic power supply, said feed wheel dynamically mounted above said forward end of said feed conveyor;
    a hydraulically operated collector height adjustment cylinder in fluid communication with said hydraulic power supply, said height adjustment cylinder connected at a first end to said forward support frame and at a second end to flexible connection means for adjusting the height of said feed conveyor; and,
      flexible connection means connecting said height adjustment cylinder to said feed conveyor, said flexible connection means allowing said feed conveyor to lift freely;
  a drum separator, including a variable-speed reversible hydraulic drive in fluid communication with said hydraulic power supply, said drum separator mounted longitudinally on said prime mover so as to receive rocky soil from said feed conveyor at the drum separator forward end and discharge rocks to a transfer conveyor at the drum separator aft end, wherein said drum separator slopes downward from forward to aft to encourage movement of separated rock material aft during normal operation;
  a transfer conveyor hingedly connected to said prime mover, said transfer conveyor including a variable-speed hydraulic drive in fluid communication with said hydraulic power supply;
  pivoting means in fluid communication with said hydraulic power supply for pivoting said transfer conveyor between an aft transfer position and a forward unloading position;
  a dump trailer attachable to said prime mover towing means, said dump trailer including:
    a large-capacity rock box;
    lifting means in fluid communication with said hydraulic power supply, for lifting said rock box to a controllable height for dumping;
    tilting means in fluid communication with said hydraulic power supply, for tilting said rock box to cause said rock box to dump its contents; and,
    detachable hydraulic connection means for connecting said lifting means and said tilting means to said hydraulic power supply;
  control means for controlling from said operator's cab the operation of said hydraulic power supply, said left and right windrow roller hydraulic drives, said left and right windrow height adjustment means, said feed conveyor hydraulic drive, said feed wheel hydraulic drive, said collector height adjustment cylinders, said drum separator hydraulic drive, said transfer conveyor hydraulic drive, said transfer conveyor pivot means, said dump trailer lifting means, and said dump trailer tilting means.

26. An improved rock picker system as in claim 25, wherein said control means includes remotely operated hydraulic control valves for each of: said left and right windrow roller hydraulic drives, said left and right windrow height adjustment means, said feed conveyor hydraulic drive, said feed wheel hydraulic drive, said collector height adjustment cylinders, said drum separator hydraulic drive, said transfer conveyor hydraulic drive, said transfer conveyor pivot means, said dump trailer lifting means, and said dump trailer tilting means.

27. An improved rock picker system as in claim 26 wherein said control means further includes a control panel mountable in said prime mover cab, said control panel in electrical communication with said remotely operated hydraulic control valves.

28. An improved rock picker system for collecting rock-soil mixture from the ground, separating said rocks from said soil, and collecting said rocks for disposal, comprising:
  a prime mover including forward and aft portions, an operator's cab, and an engine;
  left and right windrow assemblies foldingly connected to said prime mover forward end, each of said left and right windrows including an hydraulically powered windrow roller and an hydraulically powered windrow height adjuster;
  a collector disposed aft of said left and right windrows for receiving rock-soil mixture from said windrows, said collector comprising an hydraulically powered feed conveyor including a forward inlet end and an aft discharge end, an hydraulically powered feed conveyor front roller mounted forward of said feed conveyor inlet end, an hydraulically powered feed wheel mounted dynamically over said feed conveyor front roller at a selectable minimum gap height, and a collector height adjuster;
  an hydraulically powered drum separator for receiving rock-soil mixture from said feed conveyor aft discharge end;
  an hydraulically powered transfer conveyor for receiving separated rocks from said drum separator discharge discharging said rocks to a dump trailer; and, an hydraulic power supply in fluid communication with hydraulic loads, said hydraulic loads including said left and right windrow rollers, said left and right windrow height adjusters, said feed conveyor, said feed wheel, said collector height adjuster, said drum separator, and said transfer conveyor;

wherein each of said hydraulic loads may be selectively controlled from said operator's cab.

29. An improved rock picker system as in claim 28, wherein said hydraulic power supply is coupled to the output of said prime mover engine.

30. An improved rock picker system as in claim 28, further comprising an auxiliary power unit mounted to said prime mover, wherein said hydraulic power supply is coupled to the output of said auxiliary power unit.

31. An improved rock picker system as in claim 28, wherein said collector height adjuster comprises a collector lift frame, one or more hydraulically actuated lift cylinders, each of said one or more lift cylinders including a first end connected to said collector lift frame and at a second end connected to said collector using a flexible connector.

32. An improved rock picker system as in claim 28, further comprising an articulated hydraulically powered dump trailer for receiving and disposing of said rocks, and wherein said hydraulic loads further include said articulated dump trailer.

* * * * *